US012097567B2

(12) United States Patent
Herrington et al.

(10) Patent No.: US 12,097,567 B2
(45) Date of Patent: Sep. 24, 2024

(54) METHODS AND APPARATUSES OF OSCILLATORY PULSED ELECTROCHEMICAL MACHINING

(71) Applicant: Voxel Innovations, Inc., Raleigh, NC (US)

(72) Inventors: Daniel Herrington, Raleigh, NC (US); Eric Rountree, Raleigh, NC (US)

(73) Assignee: Voxel Innovations, Inc., Raleigh, NC (US)

( * ) Notice: Subject to any disclaimer, the term of this patent is extended or adjusted under 35 U.S.C. 154(b) by 338 days.

(21) Appl. No.: 17/565,817

(22) Filed: Dec. 30, 2021

(65) Prior Publication Data

US 2022/0119982 A1   Apr. 21, 2022

Related U.S. Application Data

(63) Continuation of application No. PCT/US2020/040819, filed on Jul. 3, 2020.

(60) Provisional application No. 62/870,882, filed on Jul. 5, 2019.

(51) Int. Cl.
*B23H 3/04* (2006.01)
*B22F 10/62* (2021.01)
*B23H 7/28* (2006.01)
*B33Y 40/20* (2020.01)
*B33Y 80/00* (2015.01)
(Continued)

(52) U.S. Cl.
CPC .............. *B23H 3/04* (2013.01); *B22F 10/62* (2021.01); *B23H 7/28* (2013.01); *B33Y 40/20* (2020.01); *B33Y 80/00* (2014.12); *C25F 3/16* (2013.01); *C25F 7/00* (2013.01); *B23H 2400/00* (2013.01)

(58) Field of Classification Search
CPC .. B23H 3/04; B23H 2400/00; B23H 2400/10; C25F 7/00; C25F 3/16
See application file for complete search history.

(56) References Cited

U.S. PATENT DOCUMENTS 8,057,645 B2   11/2011   McGee et al.
9,192,999 B2   11/2015   Carter et al.
(Continued)

FOREIGN PATENT DOCUMENTS

WO   2017218101 A1   12/2017

OTHER PUBLICATIONS

ISA/US, International Search Report and Written Opinion for corresponding PCT Patent Application No. PCT/US2020/040819, mailed Apr. 22, 2021, 15 pages.
(Continued)

*Primary Examiner* — Nicholas A Smith
(74) *Attorney, Agent, or Firm* — NK Patent Law

(57) ABSTRACT

A technique of removing material from metal parts referred to as OPECM and a corresponding OPECM processing machine are disclosed. A tool electrode is manufactured for removing material from a target workpiece, and the workpiece and tool electrode are fixed into a processing machine that imparts an oscillatory motion path or profile and applies a voltage through a flowing electrolyte solution. The disclosed technique and processing machine removes material from the surface of the target workpiece through proximal surface dissolution as the workpiece and tool electrode are brought within proximity of one another.

20 Claims, 17 Drawing Sheets

(51) Int. Cl.
 *C25F 3/16* (2006.01)
 *C25F 7/00* (2006.01)

(56) References Cited

U.S. PATENT DOCUMENTS

2006/0131184 A1* 6/2006 Mielke ................... B23H 7/28
                                                        205/651
2007/0256938 A1  11/2007 Fruth
2010/0101932 A1   4/2010 Hung et al.
2010/0324720 A1  12/2010 Zhan et al.

OTHER PUBLICATIONS

WIPO, International Preliminary Report on Patentability for corresponding PCT Patent Application No. PCT/US2020/040819, dated Jan. 11, 2022, 14 pages.

* cited by examiner

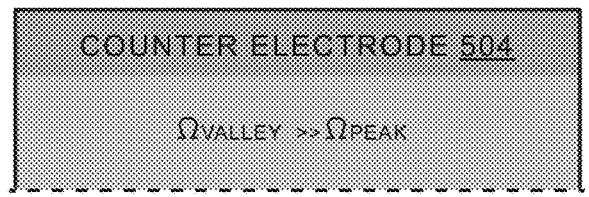
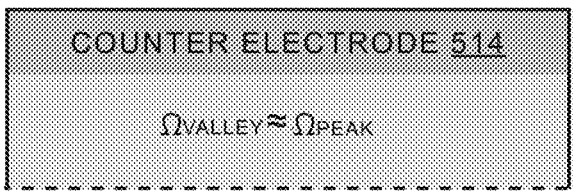
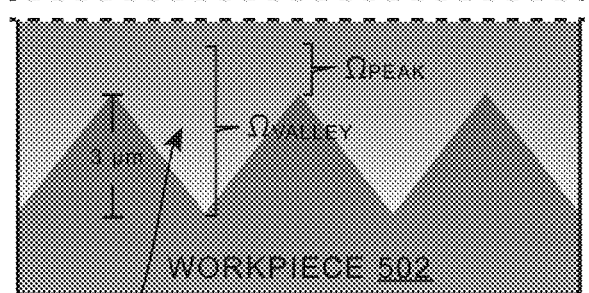
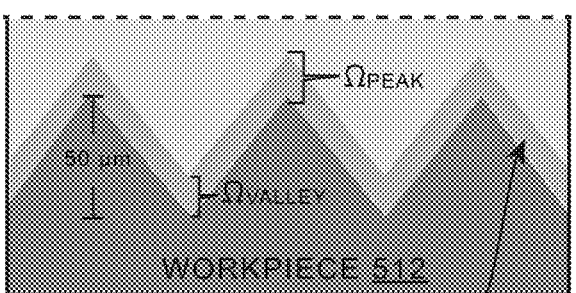
FIG. 5A
FIG. 5B
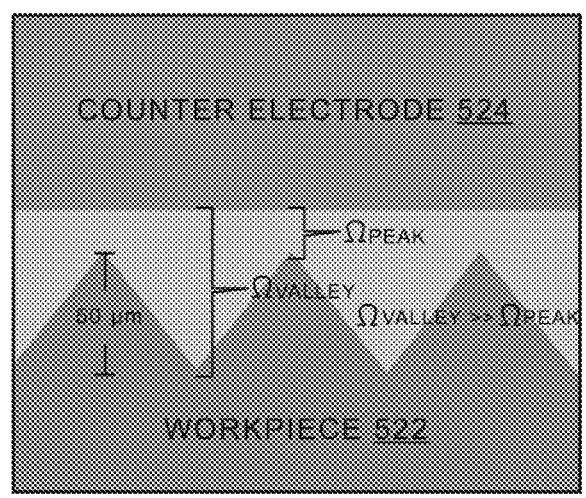
FIG. 5C

METHODS AND APPARATUSES OF OSCILLATORY PULSED ELECTROCHEMICAL MACHINING

CROSS-REFERENCE TO RELATED APPLICATIONS

This application is a continuation of International Patent Application No. PCT/US2020/040819 filed on Jul. 3, 2020 by Voxel Innovations, Inc., entitled "METHODS AND APPARATUSES OF OSCILLATORY PULSED ELECTROCHEMICAL MACHINING", which claims priority to U.S. Provisional Patent Application No. 62/870,882 filed on Jul. 5, 2019 by Voxel Innovations, Inc., entitled "ELECTROCHEMICAL MACHINING OF ADDITIVELY MANUFACTURED PARTS", the entire contents of all of which are incorporated by reference herein.

GOVERNMENT SUPPORT

This invention was made with U.S. Government support under Contract No. N6833518C0827, a Small Business Innovative Research (SBIR) Phase I contract, awarded by the Department of Defense. The Government may have certain rights in this invention.

TECHNICAL FIELD

The field of the invention relates generally to methods, systems, and apparatuses for performing electrochemical machining. More specifically, the field of the invention relates to removing material from a target workpiece using a tool electrode that is offset from the target workpiece by oscillating the tool electrode in two or three dimensions by following a defined motion path while circulating an electrolytic solution to create an electrical resistance that performs material removal.

BACKGROUND

Three-dimensional (3D) printing (also referred to as "additive manufacturing," or "AM" for short) has become increasingly popular. The surface finish of metal components fabricated using 3D-printing technologies may be unacceptable for many applications. For example, surface roughness from electron beam melting AM may be greater than 20 μm roughness average ($R_a$). Such a rough surface finish can negatively affect the fatigue life of the component because poor surface roughness leads to stress localization. Most traditional processes for improving surface roughness do not effectively handle such poor starting roughness. There is no suitable method for finishing 3D-printed metal components because of part complexity and the particular form of roughness generated by 3D-printing processes.

Electrochemical machining (ECM) is a known surface-finishing technique in which the inverse shape of a tool electrode is copied into a conductive workpiece by anodic dissolution. In ECM, a voltage is applied along with a constant flow of electrolyte solution in the gap between the tool electrode and the workpiece while continuously moving the tool electrode towards the workpiece and dissolving material in close proximity to the tool electrode surface. It is a heat-free, stress-free, non-contact machining technique that can machine metals without regard to hardness, brittleness, or elasticity. ECM can achieve surface finish values below 200 nm $R_a$ with no recast layer, heat affected zone (HAZ), or other modification to the material properties.

Pulsed electrochemical machining (PECM) is a known surface-finishing technique in which a pulsed voltage waveform is used in conjunction with the ECM technique described above. PECM allows for increased current density and greater control over the electrochemical reaction-diffusion layer and can achieve surface finish values below 10 nm $R_a$. ECM, however, is not always commercially viable because of the expenses associated with tool development. Because of the expenses, conventional ECM processes are generally unworkable for prototyping and low-volume production applications.

High-throughput polishing techniques that polish the entire surface of a component have been developed. However, these polishing techniques may leave behind imperfections that are of a larger amplitude or wavelength than is acceptable. For example, electropolishing operates using ion diffusion as its control mechanism, which can only occur at the sub-micron level within the time window of the technique. While single-point machining techniques, such as mechanical grinding or milling, are capable of addressing this scale of surface roughness, they are impractical when considering the surface complexity of the parts being produced by AM methods.

Thus, there is a need for a surface finishing technique capable of economically removing surface roughness of any scale.

SUMMARY

The invention disclosed herein solves the above-identified problems by providing an improved surface-finishing technique for 3D-printed parts, referred to as "Oscillatory Pulsed Electrochemical Machining" (OPECM), that enables simplified tool development process, thereby circumventing the traditional expense of the ECM technique. OPECM provides for high-throughput finishing while distinguishing between intentional features and surface roughness, which addresses the AM challenges described above. OPECM removes macro-scale (>3 μm $R_a$) surface roughness or distortions from AM components, thereby improving the fatigue characteristics (e.g., high cycle-fatigue life) or other performance metrics of the components.

The OPECM technique disclosed herein provides numerous advantages over existing machining or finishing techniques. For example, the OPECM technique disclosed herein provides the ability to quickly achieve low surface roughness values on complex parts, which is valuable for surface finish and fatigue life. Additionally, the OPECM technique disclosed herein provides the ability to achieve lower roughness values than are possible through other methods. Further, the OPECM technique disclosed herein provides the ability to start with very rough surfaces and still achieve low surface roughness.

The OPECM technique described herein provides a novel adaptation of the known ECM technique in which a tool electrode may be 3D-printed in situ with the desired workpiece. The workpiece and tool electrode are then fixed in an OPECM machine, and an oscillatory motion path is imparted along with bi-polar voltage pulses and a flowing electrolyte solution. The OPECM technique machines or polishes the surface of the component, operating through proximal surface dissolution as the workpiece and tool are brought within 20 μm of one another, thus giving machining accuracy comparable to CNC milling and process speed that is faster than electropolishing. Using the OPECM technique disclosed herein, sub-200 nm surface finishes are achievable through the proximity effect that is unique to OPECM.

The fatigue performance of samples produced using the OPECM technique disclosed herein compared to as-printed samples has shown an average 65% improvement in fatigue life for the OPECM samples (0.6 μm $R_a$) over the as-printed samples (12 μm $R_a$).

In one embodiment, a method of electrochemical machining of additively manufactured parts is disclosed. The method of electrochemical machining includes designing a tool electrode to be used for removing material from a target workpiece. The shape of the tool electrode is based on the shape of the target workpiece. The method of electrochemical machining includes manufacturing the target workpiece using additive manufacturing. The method of electrochemical machining includes manufacturing the tool electrode using additive manufacturing. The method of electrochemical machining includes fixing the target workpiece into a first platform of the processing machine. The method of electrochemical machining includes fixing the tool electrode into a second platform of the processing machine. The target workpiece and the tool electrode are aligned when fixed into the processing machine such that there is a gap between a surface of the target workpiece and a surface of the tool electrode. The method of electrochemical machining includes removing material from the target workpiece by causing the tool electrode to oscillate relative to the target workpiece while creating a voltage differential across the gap between the surface of the target workpiece and the surface of the tool electrode. The method of electrochemical machining includes removing the tool electrode.

In some embodiments of the method of electrochemical machining of additively manufactured parts, the shape of the tool electrode is defined by an offset from the target workpiece.

In some embodiments of the method of electrochemical machining of additively manufactured parts, the target workpiece and the tool electrode are manufactured together in-situ.

In some embodiments of the method of electrochemical machining of additively manufactured parts, the tool electrode is manufactured separately from the target workpiece.

In some embodiments of the method of electrochemical machining of additively manufactured parts, the tool electrode includes one or more through-holes to allow for flow of an electrolytic solution.

In some embodiments, the method of electrochemical machining of additively manufactured parts further includes circulating an electrolytic solution in the gap between the surface of the target workpiece and the surface of the tool electrode to create an electrical resistance between the surface of the tool electrode and the surface of the target workpiece.

In some embodiments of the method of electrochemical machining of additively manufactured parts, wherein the motion occurs in two dimensions.

In some embodiments of the method of electrochemical machining of additively manufactured parts, the motion occurs in three dimensions.

In some embodiments, the method of electrochemical machining of additively manufactured parts further includes adjusting the motion path to compensate for the gap between the tool electrode and the target workpiece becoming larger as material is removed.

In some embodiments of the method of electrochemical machining of additively manufactured parts, the tool electrode is removed by manually removing the tool electrode from the machine.

In some embodiments of the method of electrochemical machining of additively manufactured parts, the tool is removed by dissolving the tool electrode by applying an anodic voltage to the tool electrode.

In another embodiment, an apparatus for electrochemical machining of additively manufactured parts is disclosed. The apparatus includes a first platform for mounting a target workpiece. The first platform includes a mounting feature. The apparatus includes a second platform for mounting a tool electrode. The second platform includes a mounting feature. The target workpiece and the tool electrode are aligned when mounted to the first platform and the second platform such that there is a gap between a surface of the target workpiece and a surface of the tool electrode. The apparatus includes a motion controller configured to move the target workpiece and the tool electrode relative to one another, wherein the motion follows a motion profile stored in the motion controller. The apparatus includes a voltage controller configured to create a voltage differential across the gap between the surface of the target workpiece and the surface of the tool electrode. The apparatus includes an electrolytic solution that creates an electrical resistance in the gap between the surface of the target workpiece and the surface of the tool electrode, wherein the electrolytic solution flows in the gap.

In some embodiments of the apparatus for electrochemical machining of additively manufactured parts, the shape of the tool electrode is defined by an offset from the target workpiece.

In some embodiments of the apparatus for electrochemical machining of additively manufactured parts, the tool electrode includes one or more through-holes to allow for flow of the electrolytic solution.

In some embodiments of the apparatus for electrochemical machining of additively manufactured parts, the motion occurs in two dimensions.

In some embodiments of the apparatus for electrochemical machining of additively manufactured parts, the motion occurs in three dimensions.

In some embodiments of the apparatus for electrochemical machining of additively manufactured parts, the motion controller is further configured to adjust the motion path to compensate for the gap between the tool electrode and the target workpiece becoming larger as material is removed.

In some embodiments of the apparatus for electrochemical machining of additively manufactured parts, the voltage controller is further configured to dissolve the tool electrode by applying a constant anodic voltage to the tool electrode.

BRIEF DESCRIPTION OF THE DRAWINGS

FIGS. 5A-5C show a comparison between the OPECM technique disclosed herein and traditional electropolishing.

DETAILED DESCRIPTION

Figure 1A:
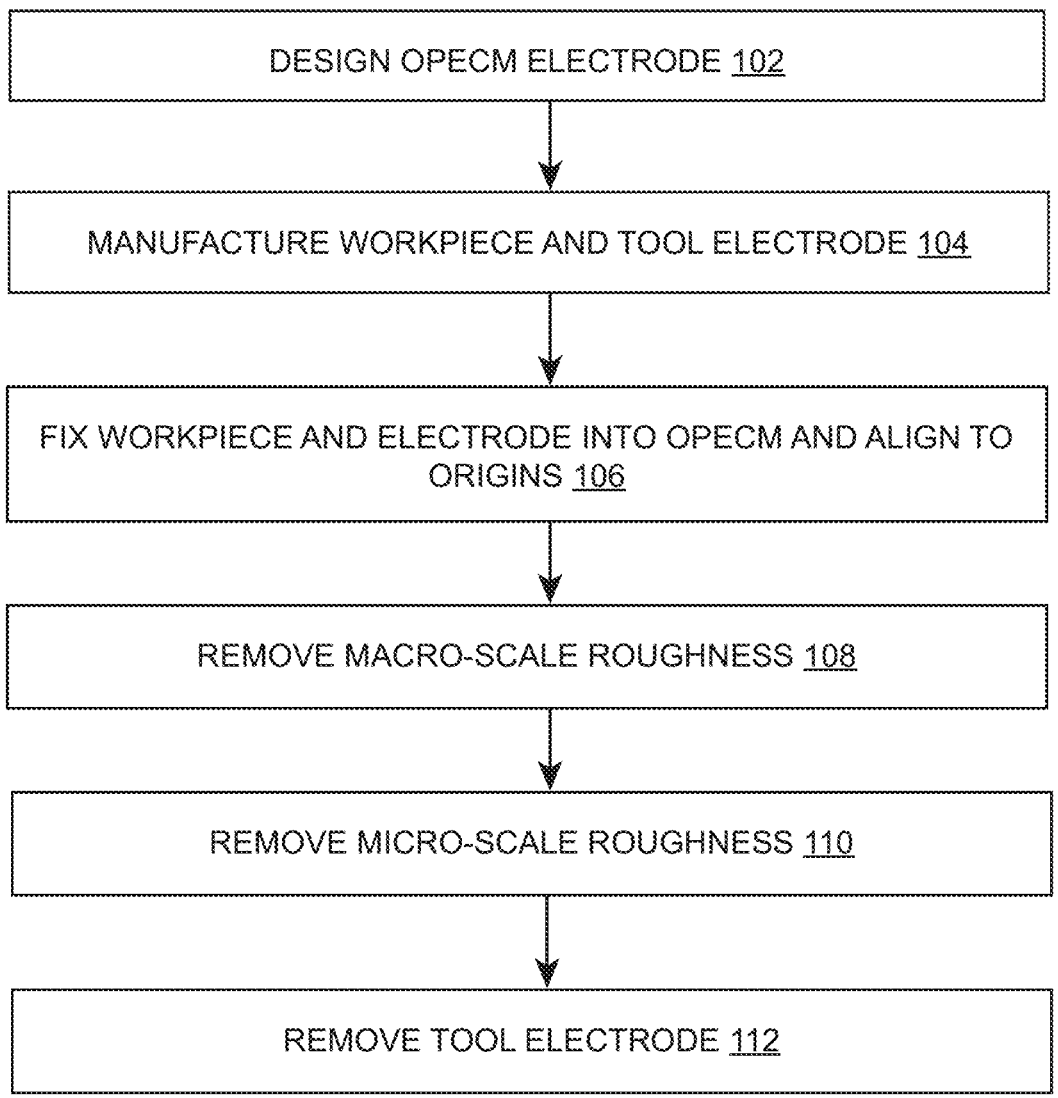
FIG. 1A shows an exemplary OPECM process.

The OPECM technique described herein provides a way to machine or remove material from a target workpiece using a tool electrode. This OPECM technique may be used with target workpieces and tool electrodes that have been manufactured using any known manufacturing process, such as additive manufacturing, joining, machining, forming, casting, and moulding, which may include forging, casting, milling, turning, EDM-ing, grinding, waterjet machining, laser machining, powder metallurgy, injection molding, stamping, or the like. Although the concepts described herein are described in the context of additively manufactured components, it will be understood that the principles described herein should not be limited to additive manufacturing and apply to other manufacturing processes as well.

In the OPECM technique disclosed herein, a tool electrode may be printed in situ with the workpiece. The material removal with the tool electrode occurs using a specialized motion profile. The tool electrode moves relative to the workpiece such that all surfaces of the workpiece experience equal time in close proximity (e.g., within 20 µm) to the surface of the tool electrode. A bi-polar pulsed waveform is applied to simultaneously machine both surfaces (i.e., the workpiece and the tool electrode).

The specialized motion profile or motion path of the tool electrode provides the machining or material removal of the component. In the OPECM technique disclosed herein, the tool moves along two or more axes. The movement may occur either linearly or rotationally (or both) with respect to each of the multiple axes. The motion along the multiple axes (either linear motion or rotational motion) is coordinated such that it continuously moves with respect to multiple axes.

The movement along each of the axes is coordinated with a power supply to supply electrical potential used for ECM. The electrical potential may be in a positive or negative polarity. The electrical potential may be applied continuously (DC) or in pulsed waveforms. The electrical potential may include voltage potentials from 0 to 100V. In pulsed formats, the waveform may be any variety of shapes and a range of pulse widths from infinite widths to nano-second widths.

As explained above, the OPECM technique disclosed herein may be used for finishing of metal 3D-printed parts. An OPECM electrode is manufactured to be used for polishing a target part. In one embodiment, the electrode is 3D-printed in-situ with the target part. In another embodiment, the electrode is 3D-printed separately from the target part. The printed OPECM electrode is used to finish all surfaces or select surfaces of the target part using the OPECM technique. Once the finishing of the surfaces of the target part is complete, the printed OPECM electrode may be dissolved, either entirely or in select locations, using the OPECM technique to reveal the target underneath. Accordingly, the OPECM technique disclosed herein allows for printing of OPECM electrodes in hard-to-reach or internal cavities to finish surfaces that would be otherwise difficult or impossible to access. The OPECM electrode may be dissolved out afterwards.

In addition to using OPECM to finish metal components, OPECM may also be used to finish any other type of part including cast, forged, milled, etc.

The OPECM technique disclosed herein provides for removal of roughness by using proximity-based dissolution. In proximity-based dissolution, differences in the resistance and required current load between the peaks and valleys of the surface allow for preferential dissolution of the peaks.

FIG. 1A shows an exemplary OPECM process. It will be understood that the OPECM process described herein is intended to be used to remove material from a workpiece (i.e., the target workpiece). As explained above, the target workpiece may be manufactured using any known manufacturing process. In one embodiment, the target workpiece is manufactured using additive manufacturing (e.g., the workpiece is 3D printed or will be 3D printed). The OPECM process described herein and the principals explained herein may be used to remove material from a target workpiece of any shape. In one embodiment, the material removal is used for polishing the target workpiece to remove surface roughness. In another embodiment, the material removal is used to change the shape/geometry of the target workpiece.

As shown in FIG. 1A, the OPECM process includes designing an OPECM tool electrode (step 102). The OPECM tool electrode will be used to remove material from the workpiece. The design of the tool electrode is specific to the target workpiece from which material is to be removed, such that the tool electrode is designed to remove material from the specific workpiece. As such, the shape of the tool electrode is based on the shape of the target workpiece. The shape of the tool electrode is defined by an offset from the target workpiece. Although the shape of the tool electrode may not perfectly match the shape of the target workpiece, it should be understood that the principles used to design the tool electrode include creating surfaces of the tool electrode that are similar in shape to the surfaces of the target workpiece. For example, the offset may be a uniform offset or a non-uniform offset, depending on the shape, features, and desired machining or material removal rate of the target workpiece. The offset may be selected, for example, to achieve a target geometry of the target workpiece when material removal from the target workpiece has completed or to account for varying machining speeds of features of the target workpiece. In one embodiment (explained below in the context of FIG. 1B), the tool electrode is designed and manufactured in-situ along with the workpiece. In another embodiment (explained below in the context of FIG. 1C), the tool electrode is designed and manufactured separately from the workpiece.

As shown in FIG. 1A, after the OPECM tool electrode has been designed based on the target workpiece, the target workpiece and the tool electrode are manufactured using, for example, additive manufacturing (step 104). The workpiece and the tool electrode may be manufactured using any known method of additive manufacturing. When the manufacturing (e.g., printing) of the target workpiece and the tool electrode is complete (either separately printed or printed together in-situ), the workpiece and tool electrode are electrically separated from each other.

As part of designing the workpiece and the tool electrode for the OPECM technique described herein, a platform may be built onto both the workpiece and the tool electrode. When the parts are removed from the build plate, the platform of the workpiece and the platform of the tool electrode are made into parallel planes. If any other surfaces are used for alignment, they are processed during this step so that after installation into the OPECM machine, the gap between the workpiece and tool electrode remains as-printed and uniform. After preparation of the aligning faces, and prior to installation into the OPECM machine, the workpiece and tool electrode must be disconnected. For example, if the workpiece and the tool electrode are attached during the build process, they will be separated before machining so that they can move independently of one another. This may not be necessary in all cases, for example, in cases where the tool electrode is printed separately from the workpiece.

As shown in FIG. 1A, after the target workpiece and the tool electrode have been manufactured (either together or separately), the workpiece and the tool electrode are fixed into an OPECM processing machine and aligned (step 106). In one embodiment, the points to which the workpiece is fixed are physically separate from the points to which the tool electrode is fixed, such that the workpiece and the tool electrode can move relative to one another. The origins are one or more points within an OPECM processing machine that may be used to provide a reference point for the target workpiece and the tool electrode. For example, an OPECM processing machine used for the OPECM process described herein may include multiple platforms that provide locations for mounting the target workpiece and the tool electrode using the platforms built into the target workpiece and the tool electrode.

As shown in FIG. 1A, after the workpiece and the tool electrode have been fixed in the OPECM processing machine and aligned, the OPECM process removes material to accomplish macro-scale material removal from the workpiece (step 108). The macro-scale material is removed by oscillating the workpiece and the tool electrode independently of one another. The workpiece and tool electrode are oscillated using a predetermined motion path that causes the surfaces of the workpiece and the tool electrode to come within proximity of one another. Because the surface of the workpiece is defined both in the workpiece itself and in the tool electrode, and these two components will be machined simultaneously through proximity, this technique can remove practically any scale of surface roughness. The removal of macro-scale surface roughness is achieved by applying a voltage waveform across the gap between the tool electrode and the target workpiece. In one embodiment, the voltage waveform may be a bipolar, low-voltage (<15 V) pulse sequence. A flowing electrolyte between the two components is used, and an imparted oscillation brings the workpiece and tool electrode to within 20 μm of one another, with this proximity being evenly distributed with respect to time. The low voltage ensures that the majority of material removal occurs only when the two surfaces are near one another while the oscillation profile ensures an equal distribution of machining time to all surfaces of the workpiece such that a tight surface profile tolerance is maintained.

As shown in FIG. 1A, after the macro-scale material has been removed, the OPECM process removes micro-scale material removal from the workpiece (step 110). The micro-scale material removal is removed using a traditional electropolishing approach. The transition point between macro-scale and micro-scale is in the range of 1 μm $R_a$.

As shown in FIG. 1A, after the micro-scale material has been removed, the tool electrode is removed (step 112). The removal of the tool electrode leaves the machined or polished workpiece. In most applications of OPECM, the tool electrode encapsulates the workpiece and therefore requires removal after OPECM is complete. In one embodiment, the tool electrode may be removed by applying a constant anodic voltage to the tool electrode, thus dissolving it away until the workpiece is freed. In such a case, the tool electrode may be designed with a draft such that the electrode's body becomes thinner as it stretches from its fixturing point, creating a gradual peeling action. This prevents tool electrode flakes forming and causing electrical shorts that could damage the workpiece. In another embodiment, the tool electrode may be removed without having to completely dissolve it, which may be accomplished by printing thinner seams into the tool electrode that will allow removal of the tool electrode without having to completely dissolve it.

Figure 1B:
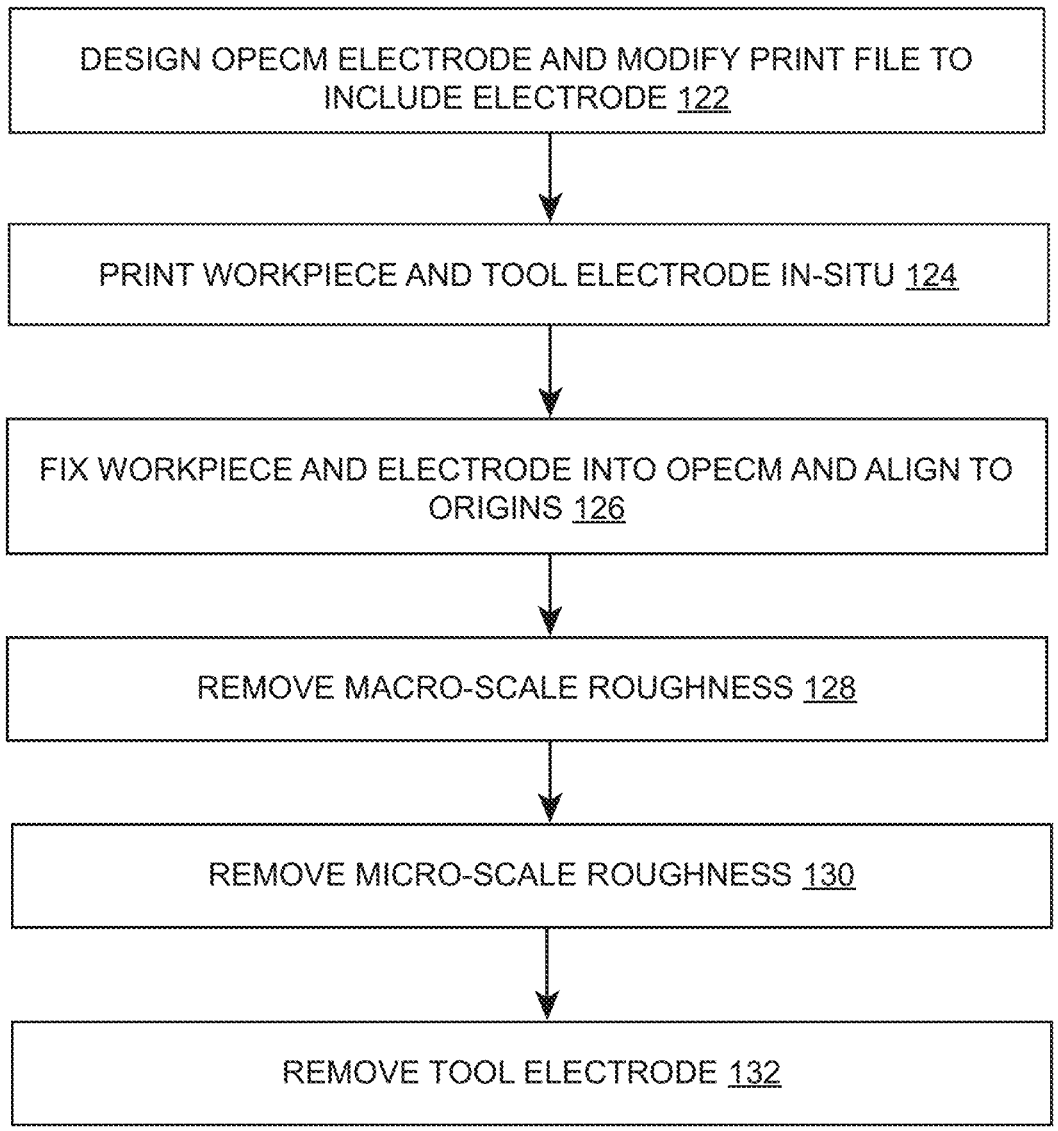
FIG. 1B shows a variation of the exemplary OPECM process shown in FIG. 1A, in which the OPECM tool electrode is designed and the print file of the workpiece is modified to include the tool electrode such that the workpiece and the tool electrode are printed together in-situ.

FIG. 1B shows a variation of the exemplary OPECM process shown in FIG. 1A, in which the OPECM tool electrode is designed and the print file of the workpiece is modified to include the tool electrode (step 122) such that the workpiece and the tool electrode are printed together in-situ (step 124). By designing the tool electrode and modifying the print file of the workpiece to include the tool electrode, the workpiece and the tool electrode may be printed such that they are properly aligned relative to each other for the OPECM technique to be applied. In addition, by designing the tool electrode and modifying the print file of the workpiece to include the tool electrode, tool electrodes may be used for complex workpieces where a separate tool electrode could not reasonably be used. For example, a workpiece with a lot of internal surfaces, such as a sphere, could not necessarily be machined using a tool electrode that is printed separately but could be machined using a tool electrode that was designed into the sphere's cavity and printed within the sphere.

Once the desired target workpiece has been designed, the print file for that workpiece is modified to accommodate application of the OPECM technique. There are multiple considerations for the new print file, for example, (1) the tool electrode and extra material that will be printed along with the workpiece, (2) accommodations for electrolyte flow, (3) accommodations for alignment of the workpiece and tool electrode in the OPECM machine, and (4) making for easy removal and/or dissolution of the tool electrode after the OPECM material removal has been performed. A simplified example of this is shown in FIG. 3.

The remaining steps of the OPECM process shown in FIG. 1B (steps 126, 128, 130, and 132) are similar to those shown and described in the context of FIG. 1A (steps 106, 108, 110, and 112).

Figure 1C:
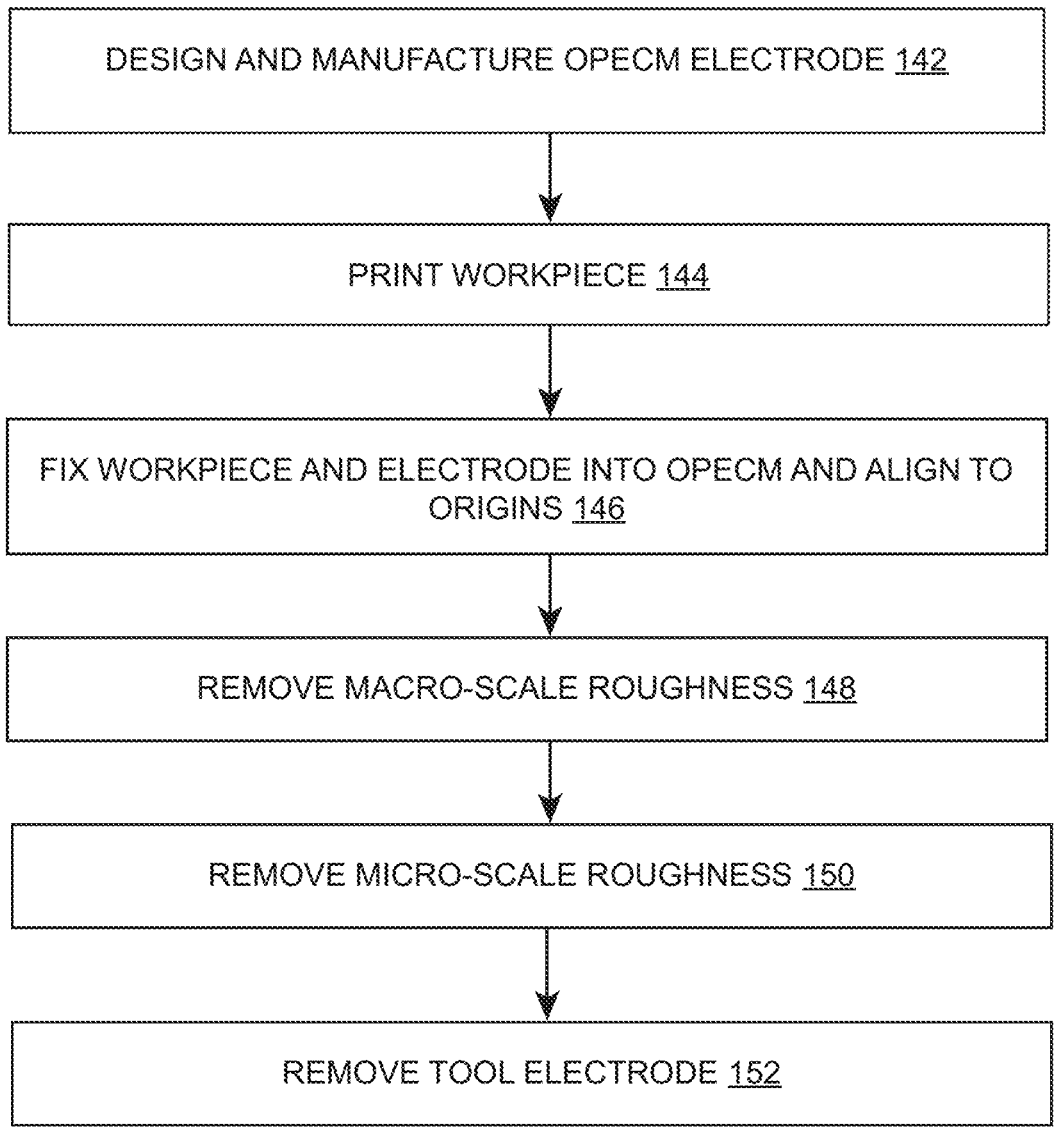
FIG. 1C shows a variation of the exemplary OPECM process shown in FIG. 1A, in which the OPECM tool electrode is designed and manufactured separately from the workpiece.

FIG. 1C shows a variation of the exemplary OPECM process shown in FIG. 1A, in which the OPECM tool electrode is designed and manufactured separately from the workpiece. As shown in FIG. 1C, the OPECM tool electrode is designed and printed separately from the workpiece (step 142 for the OPECM tool electrode and step 144 for the workpiece). This embodiment is beneficial for polishing already-existing workpieces, for decreasing machining time, and for improving the tolerances of the printed part. After the tool electrode and workpieces have been manufactured separately, the remaining steps of the OPECM process shown in FIG. 1C (steps 146, 148, 150, and 152) are similar to those shown and described in the context of FIG. 1A (steps 106, 108, 110, and 112).

Figure 2A:
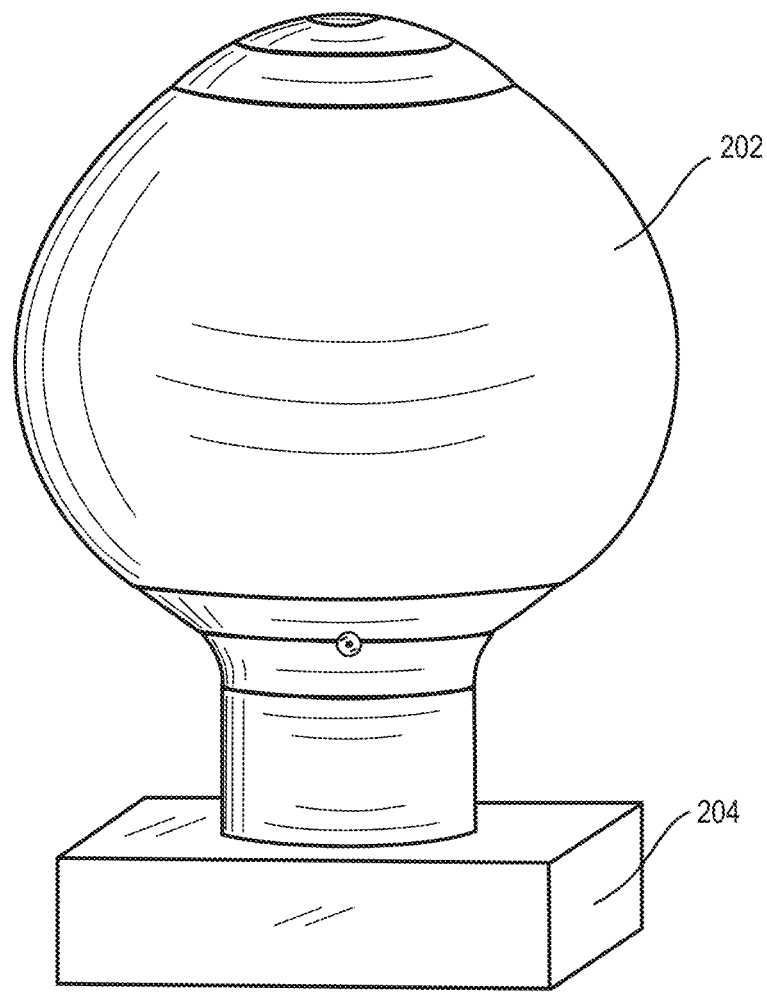
FIG. 2A shows an exemplary three-dimensional component.
Figure 2B:
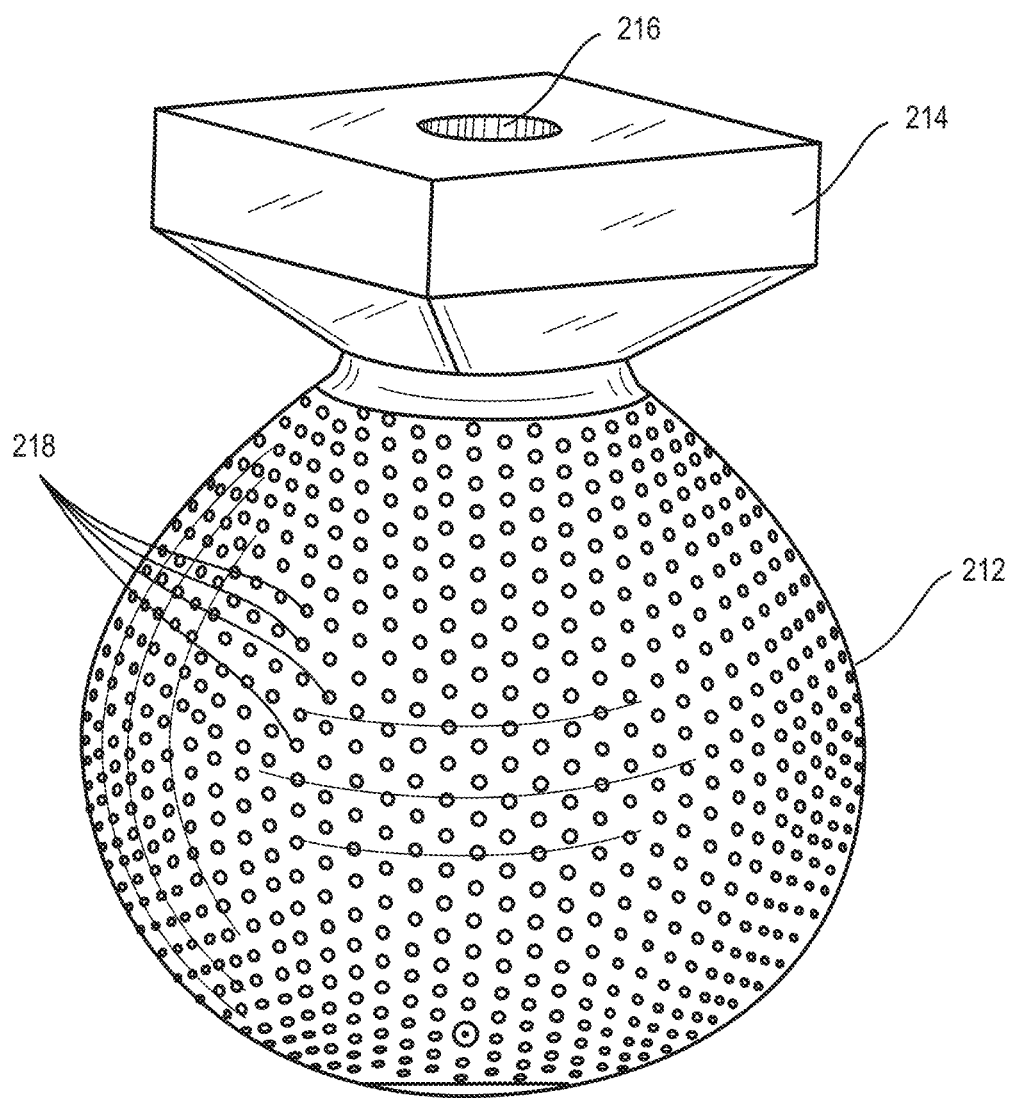
FIG. 2B shows an exemplary corresponding tool electrode for the OPECM technique disclosed herein.

FIG. 2A shows an exemplary three-dimensional component, and FIG. 2B shows an exemplary corresponding tool electrode for the OPECM technique disclosed herein. Referring to FIG. 2A, the spherical workpiece 202 includes a mounting structure 204 at the bottom. This mounting structure 204 can be used to fix the workpiece 202 to an OPECM processing machine for the OPECM material removal technique. The mounting structure 202 may have one or more holes (not shown) therethrough to allow for fixing the workpiece 202 to the OPECM machine. Referring to FIG. 2B, the tool 212 includes a mounting structure 214 at the top. This mounting structure 214 can be used to fix the tool 212 to an OPECM processing machine for the OPECM material removal technique. The mounting structure 214 may have one or more holes 216 therethrough to allow for fixing the tool 212 to the OPECM machine. In one embodiment, the mounting structure 214 is a platform with one or more mounting features 216 (e.g., holes) that is used to connect to a platform in an OPECM machine. As explained in the context of FIG. 1, the workpiece and the tool can be separately fixed to the OPECM processing machine such that they can move relative to one another, which allows for the material removal to occur as the two pieces oscillate near to each other. As shown in the example of FIGS. 2A and 2B, the tool 212 is shaped such that it encapsulates the workpiece 202. In the example shown in FIG. 2B, the tool 212 includes flow-through holes 218 that allow for an electrolytic solution to flow into the gap between the workpiece 202 and the tool 212.

Figure 2C:
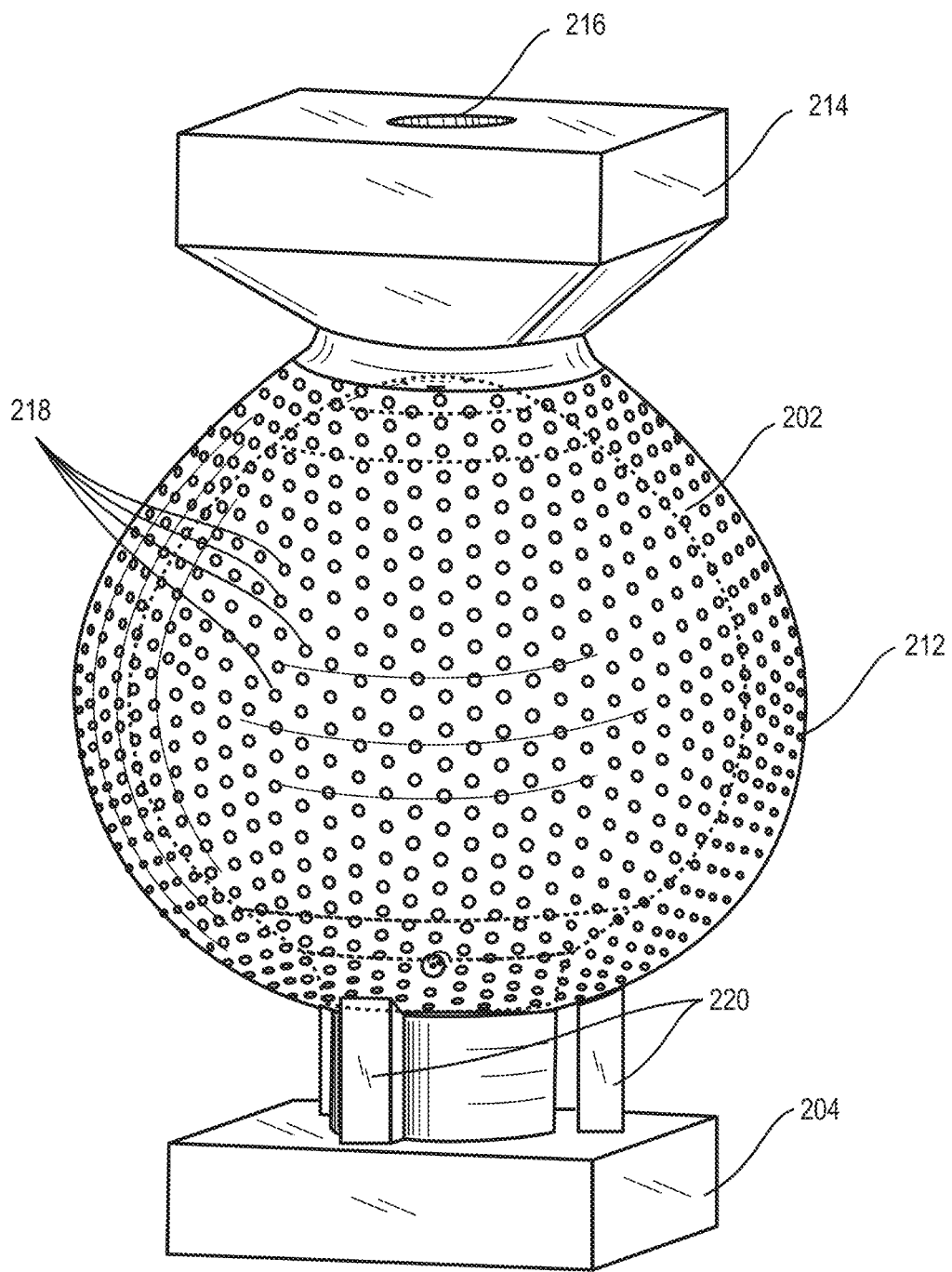
FIG. 2C shows an exemplary printing configuration in which the workpiece and tool are printed together in-situ.

FIG. 2C shows an exemplary printing configuration in which the workpiece 202 and tool 212 are printed together in-situ (as described in the context of FIG. 1B). The printing configuration shown in FIG. 2C allows for the pieces to be fixed in the OPECM processing machine without further aligning since they are properly aligned to one another as-printed. Referring to FIG. 2C, the workpiece 202 (shown in a dashed line) is printed inside tool 212 with a gap between them to allow for electrolyte flow through flow-through holes 218. In some embodiments, additional support structures 220 may be printed to support the tool 212.

Figure 2D:
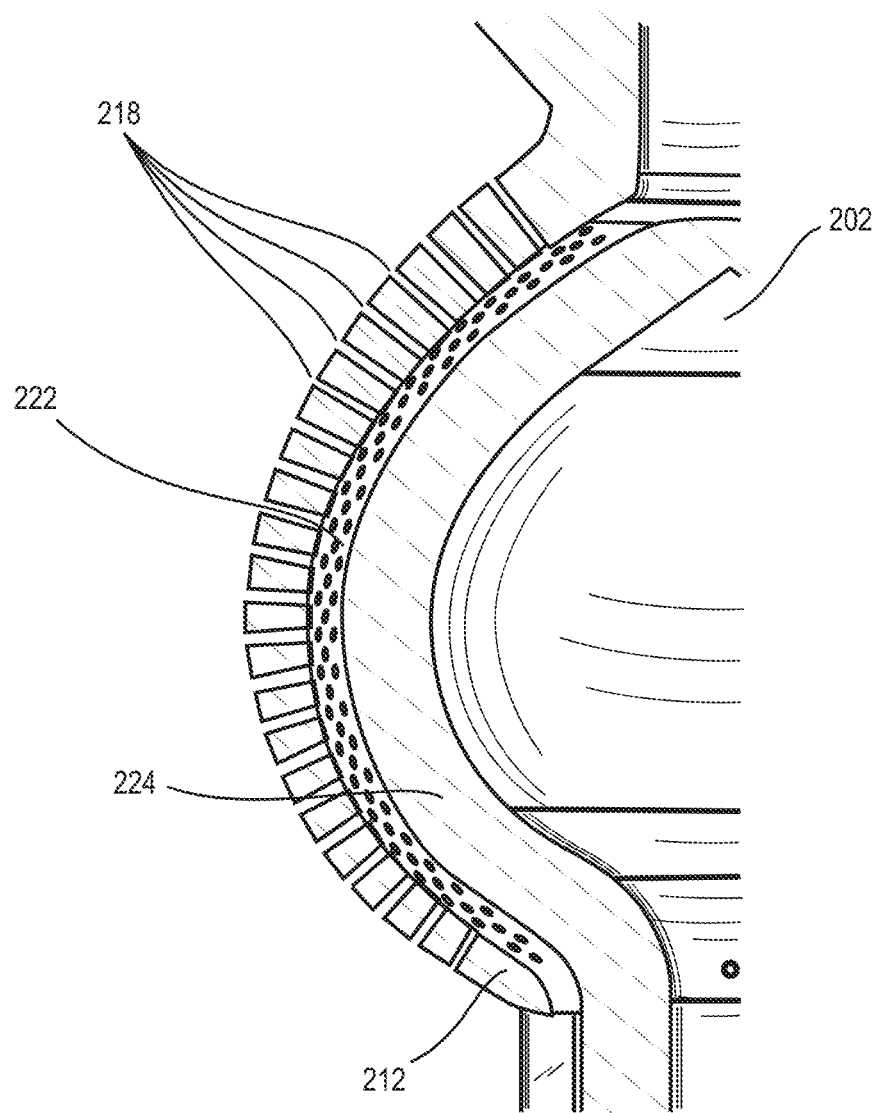
FIG. 2D includes a sectioned view of the interaction between the workpiece on the inside and the tool on the outside.

FIG. 2D includes a sectioned view of the interaction between the workpiece on the inside and the tool on the outside. Referring to FIG. 2D, the flow-through holes 218 in the tool 212 and a gap 224 between the workpiece 202 and the tool 212, which allows for the flow of electrolytic solution 222 and provides room for the two pieces to oscillate relative to each other.

The OPECM technique disclosed herein uses a defined motion profile or path to oscillate and/or vibrate the tool around the workpiece to provide the surface-finishing. In some embodiments, the motion path is selected such that it evenly distributes the machining time so that all surfaces on the workpiece, regardless of their orientation, experience the same conditions. In other embodiments, the motion path is selected such that different surfaces receive different amounts of machining, as desired for the target workpiece. The predetermined motion path begins and ends at approximately the same point in space, but the motion path may be scaled along one or more axes to adjust the scale or amplitude of the motion path such that more or less material may be removed, as desired.

Figure 3A:
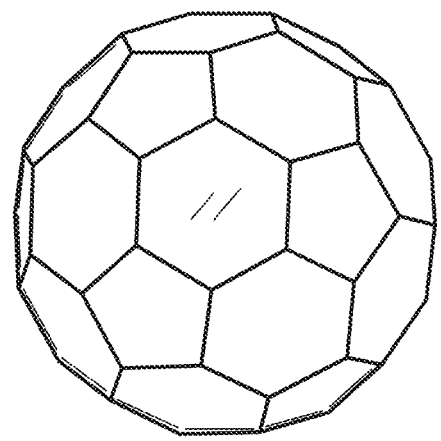
FIGS. 3A-3C show exemplary motion profiles or motion paths that may be used to oscillate the workpiece and the tool relative to one another as part of the exemplary OPECM technique disclosed herein.
Figure 3B:
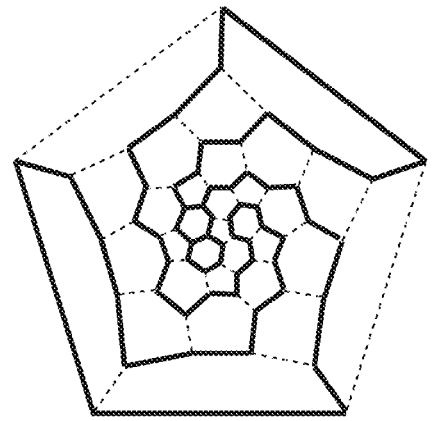
Figure 3C:
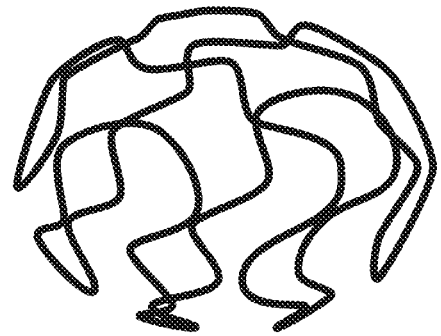

FIGS. 3A-3C show exemplary motion profiles or motion paths that may be used to oscillate the workpiece and the tool relative to one another as part of the exemplary OPECM technique disclosed herein. FIG. 3A shows a truncated icosahedron (which approximates a sphere) that may be used as a basis for a motion profile in an exemplary embodiment. FIG. 3B shows a two-dimensional representation of a Hamiltonian cover that defines motion around the sphere. FIG. 3C shows a motion path that has been converted to a fluid spline and that always remains on the surface of the sphere.

Figure 4:
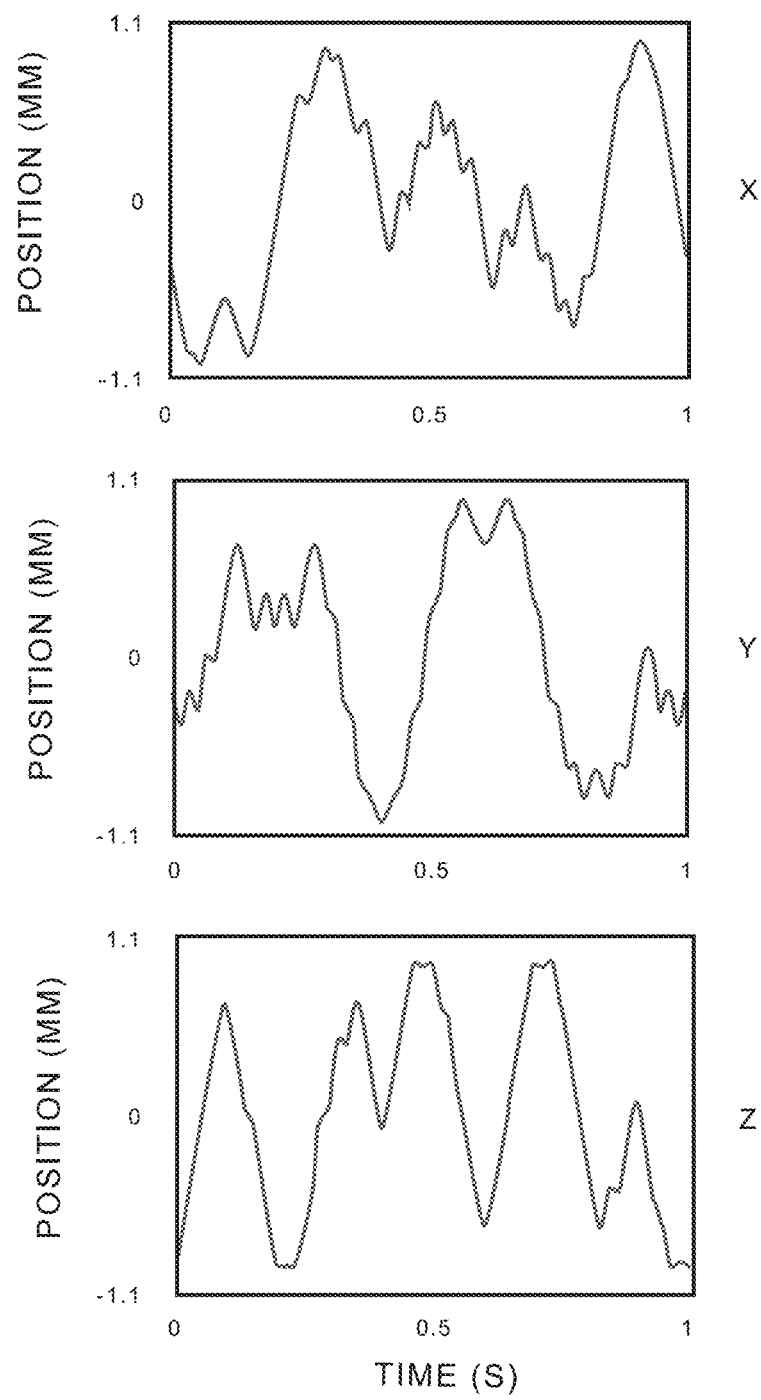
FIG. 4 shows individual motion profiles in the x-plane, y-plane, and z-plane that form the three-dimensional spline shown in FIG. 3C.

FIG. 4 shows individual motion profiles in the x-plane, y-plane, and z-plane that form the three-dimensional spline shown in FIG. 3C.

In one embodiment, the motion profile may be defined using a series of splines, as shown in FIG. 3C. The series of splines may be used to create a motion path that can be repeated and that is adaptable to a changing workpiece and tool shape. The series of splines shown in FIG. 3C may be determined by choosing a Hamiltonian cover for an icosahedron. A Hamiltonian cover represents a path of travel around a three-dimensional object that begins and ends at the same vertex, and never intersects itself. Mathematically, there are multiple Hamiltonian covers for a truncated icosahedron. FIG. 3B shows a two-dimensional depiction of one such Hamiltonian cover.

After the Hamiltonian cover has been traced, the motion path can be fit with an enclosed spline. The spline can be adjusted such that all points on its path follow the surface of a sphere of unit size. FIG. 4 shows the individual, X, Y, and Z components of the motion path.

In another embodiment, the motion path may be defined by the vertices of the truncated icosahedron shown in FIG. 3A, which are used as specific points for travel. The motion path represents a series of discrete steps following the vertices of the truncated icosahedron. This allows the motion to progress through a series of steps with the path beginning and ending in the same location. Therefore, the step locations can be defined as mathematical expressions that are the function of a sphere radius.

In some embodiments, the motion path may be custom-defined by a user to accommodate a complex shape of the target workpiece. For example, for a non-uniformly shaped target workpiece, a user may define a series of vertices that represent the inner and outer boundaries of where the workpiece will be machined, and the motion path may be set based on those inner and outer boundaries such that the tool electrode follows the odd shape of the target workpiece.

The speed at which the OPECM operation is performed may vary depending on various factors. For example, a cycle of one full path may be completed each second (e.g., operation speed of 1 Hz). A slower speed in this example may be used to accommodate added weight of the tooling and electrolyte forces. The OPECM technique may use motion systems that provide greater force and/or acceleration capabilities, which may increase the operational speed.

The motion profile may be controlled by one or more controllers that are coupled to or integrated in an OPECM processing machine. The controller may include or be coupled to one or more motors that provide the movement of the machine. The controller may be accessible using an internet connection (e.g., through a web-based portal) or via localized user-interface software. A user may program the controller by uploading, creating, and/or editing motion profiles. Using an integrated controller in an OPECM processing machine, the motion path may be actively adjusted to compensate for the growth of the sphere size as machining progresses (i.e., as material is removed from the inner surface of the spherical tool, the inner surface of the sphere becomes larger, leading to a larger gap between the workpiece and the tool). To ensure that no short-circuiting of the workpiece and tool occurs, the error in position for each axis may be limited, for example, to 5 μm.

In an example with spherical or similar motion profile, the center point of the sphere may be assigned as part of the build, and the controller maintains that positioning as the OPECM technique is performed. The beginning sphere radius may be defined using a multi-axis electrical touch-off or other alignment mechanism and is further set to expand at a rate consistent with the material removal rate in order to maintain a small, consistent gap between the workpiece and the tool. The material removal rate may be estimated based upon prior PECM knowledge and/or values determined from testing.

FIGS. 5A-5C show a comparison between the OPECM technique disclosed herein and traditional electropolishing. Traditional electropolishing works for micro-roughness because the diffusion layer (sometimes referred to as the viscous layer) is on the same size order as the roughness, which creates a resistance differential between the peaks and valleys. This resistance differential is lost for electropolishing in the context of macro-roughness because the diffusion layer is much smaller than the surface variation.

The OPECM technique disclosed herein brings the counter electrode (i.e., the printed tool electrode) within 20 μm of the surface peaks. Due to the resistance of the electrolyte, current density exponentially decays as a function of distance between the opposing electrodes. As an added effect, for many materials, the efficiency of machining acts as a function of the current density.

Since roughness as represented by $R_z$ on AM parts may be as high as 200 μm, if the gap between the tool electrode and workpiece is 20 μm, the effect of the current density-current efficiency combination is that material removal at the roughness peaks may occur over 350 times faster than the valley, focusing removal on the peaks, which rapidly lowers $R_z$ without removing core material. Once the value of $R_z$ goes below 5 μm (generally an $R_a$ value of less than 1 μm), proximity effects become negligible, and finishing then becomes controlled by the diffusion layer, which is similar to electropolishing in working principle. The parameters of the OPECM technique disclosed herein may be tuned such that the diffusion layer becomes thick in the valleys while remaining thin at the peaks, which allows for machining away the peaks.

Referring to FIG. 5A, the effect of the diffusion/viscous layer 506 for electropolishing micro-scale roughness of workpiece 502 with counter electrode 504 is shown. The thickness of the layer 506 is on the same scale as the roughness, resulting in a resistance differential between the peaks and the valleys. Referring to FIG. 5B, electropolishing loses its effectiveness with macro-scale roughness because the diffusion/viscous layer 516 is much smaller than the roughness size, leaving little differential in the resulting local current densities. Referring to FIG. 5C, the OPECM technique disclosed herein uses proximity of the counter electrode 524 (i.e., tool electrode) to the workpiece 522 to recreate the advantage that electropolishing has for micro-roughness under macro conditions.

As explained above in the context of FIG. 1, the print file for a designed workpiece is modified to accommodate application of the OPECM technique. FIGS. 6A-6E show an example of a designed workpiece being modified so that a tool electrode can be 3D-printed in accordance with the OPECM technique disclosed herein. The modifications shown in FIGS. 6A-6E illustrate an example of a transition from the designed workpiece to the OPECM print file. FIGS. 6A-6E further show an example of how the print file for the target workpiece may be modified such that the workpiece and its corresponding tool electrode may be mounted in the OPECM machine, electrolyte flow passages may be added for the tool electrode, draft on the tool electrode may be added to allow for removal of the tool electrode using dissolution-based removal, and the design may be scaled to multiple parts.

Figure 6A:
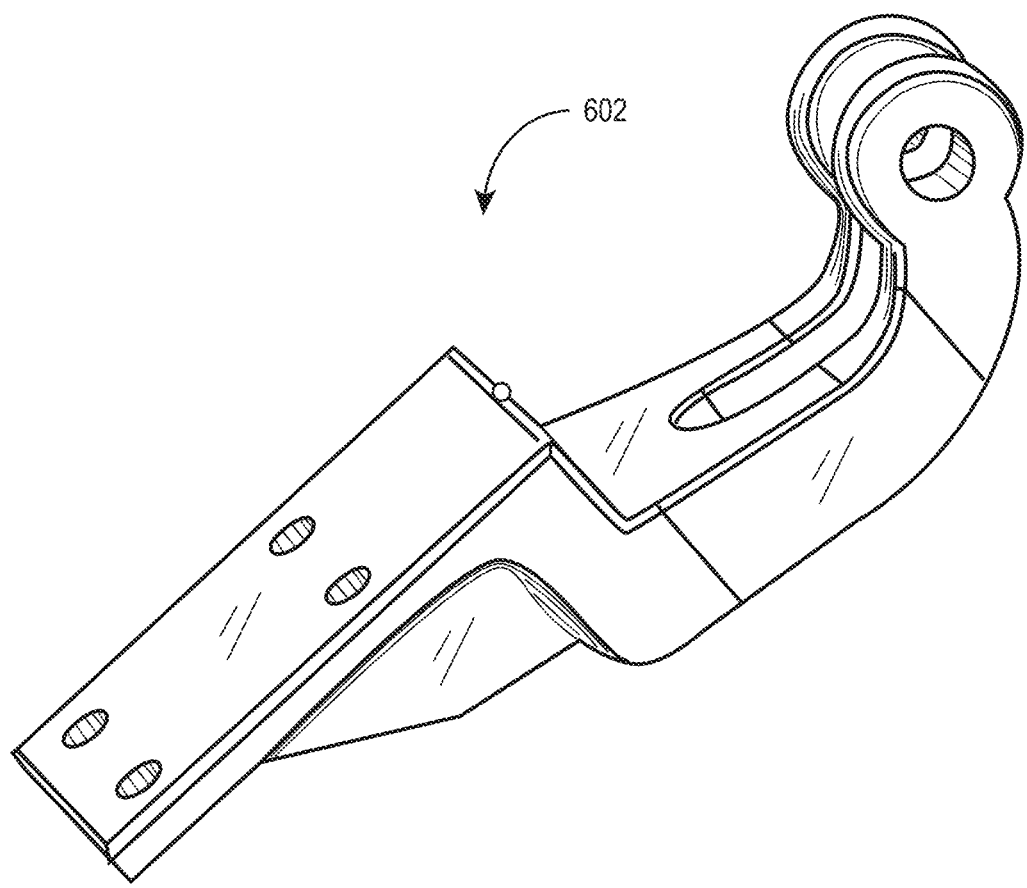
FIG. 6A shows an example of a designed workpiece for application of the OPECM technique.

FIG. 6A shows an example of a designed workpiece for application of the OPECM technique. Referring to FIG. 6A, the designed workpiece 602 is an example of a simplified, support-structure-free designed workpiece. This designed workpiece 602 is the target workpiece to be polished using the OPECM technique.

Figure 6B:
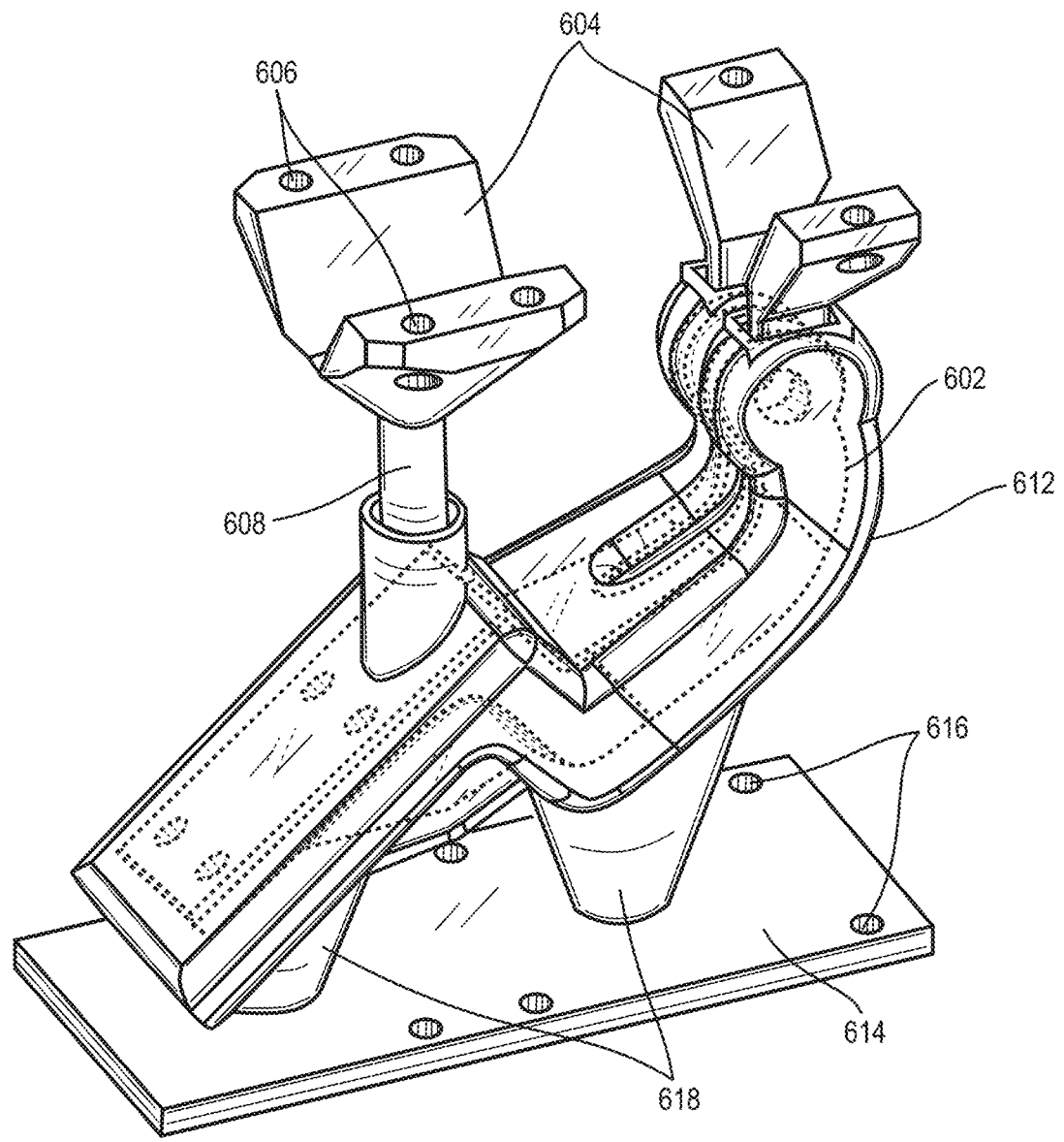
FIG. 6B shows the designed workpiece 3D printed inside a tool electrode.

FIG. 6B shows the designed workpiece 3D printed inside a tool electrode. Referring to FIG. 6B, the active surface of the tool electrode 612 represents a simple offset from the workpiece 602. In other words, the tool electrode 612 is created as an offset from all surfaces of the target workpiece 602 (shown in dotted lines), such that the tool electrode 612 encapsulates the target workpiece 602. The offset may be dependent on the material used. In one embodiment, for example, an offset of approximately 1 mm may be used. Thus, the gap between the outer surfaces of the target workpiece 602 and the inner surfaces of the tool electrode 612 is approximately 1 mm. During oscillation using the predefined motion path, this 1 mm offset may vary at any particular point in the range of approximately 0.1 mm to approximately 2.0 mm as the tool electrode and target workpiece are brought closer to one another at a first portion to allow for material removal at that portion, while moving further apart at a second portion. FIG. 6B shows an example of the creation of the encapsulating tool electrode 612 and the addition of fixturing features 604 and 614 to the tool 612 and the workpiece 602 as part of building the modified print file. In FIG. 6B, fixturing features 604 have been added to the target workpiece 602 such that the target workpiece may be mounted to a platform located on an upper surface of an OPECM machine using the added mounting holes 606. Support structures 608 have been added to the target workpiece 602 to provide support from fixturing features 604. Fixturing features 614 have been added to the tool electrode 612 such that the tool electrode may be mounted a platform located on a lower surface of an OPECM machine using the added mounting holes 616. Support structures 618 have been added to the tool electrode 612 to provide support from fixturing features 614.

Figure 6C:
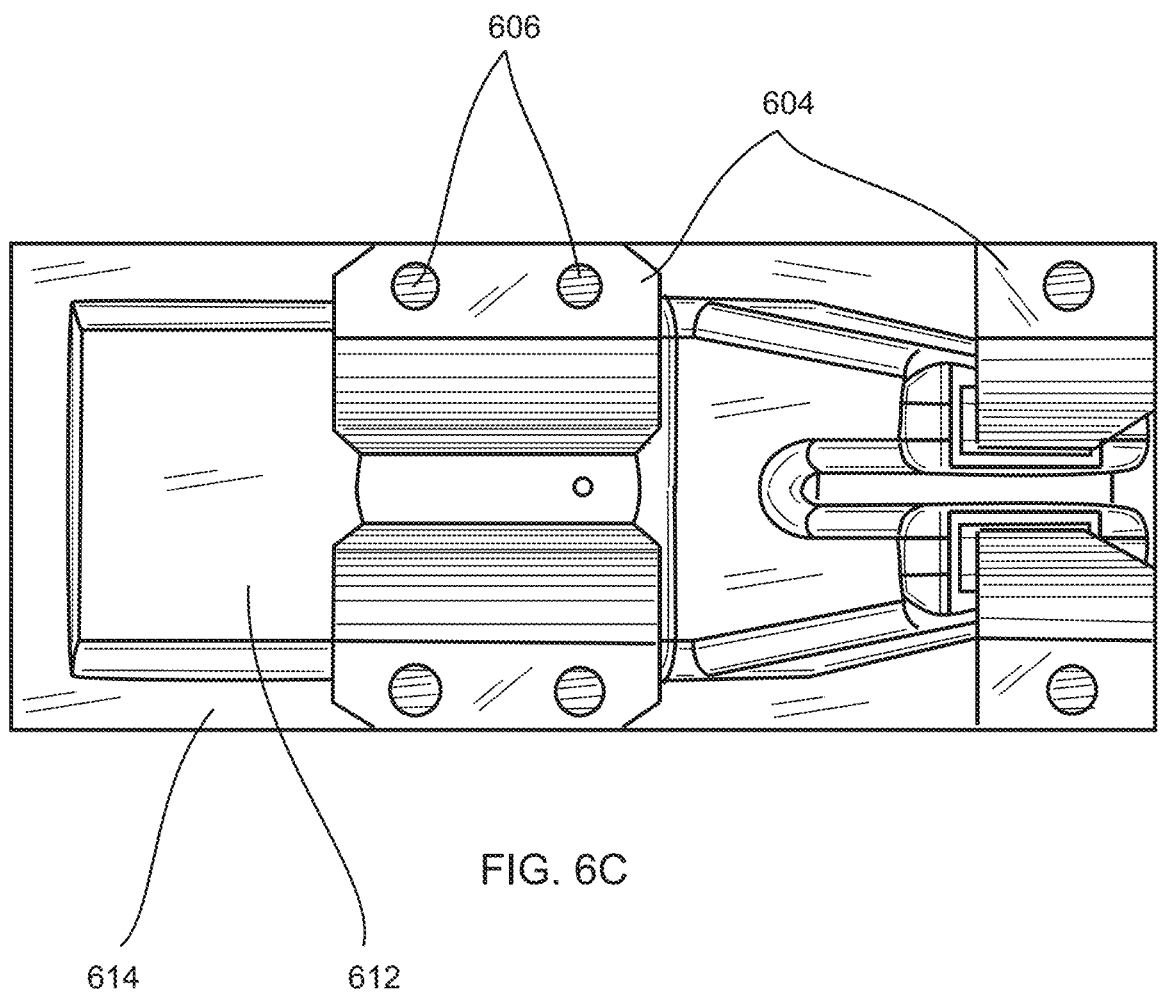
FIG. 6C shows a top view of the tool and electrode of FIG. 6B.

FIG. 6C shows a top view of the tool and electrode of FIG. 6B. As can be seen from the top-down view of FIG. 6C, the holes 606 of fixturing features 604 are vertically aligned with the holes 616 of fixturing features 614. As explained above, by aligning the fixturing features vertically, there is a common point of reference that can be used for aligning the tool to the workpiece. This is referred to as shared locating features, and these shared locating features are added to orient the workpiece relative to the build plate as part of building the modified print file. In other words, the holes 606 on the upper platform 604 for the target workpiece are vertically aligned with the holes 616 (not shown) on the lower platform 614 for the tool electrode 612. These shared locating features ensure that the target workpiece and the tool electrode will be properly aligned when mounted to the respective upper and lower platforms of an OPECM machine. This may be performed manually or with assistance from support structure software, such as, for example, Materialise Magics.

Figure 6D:
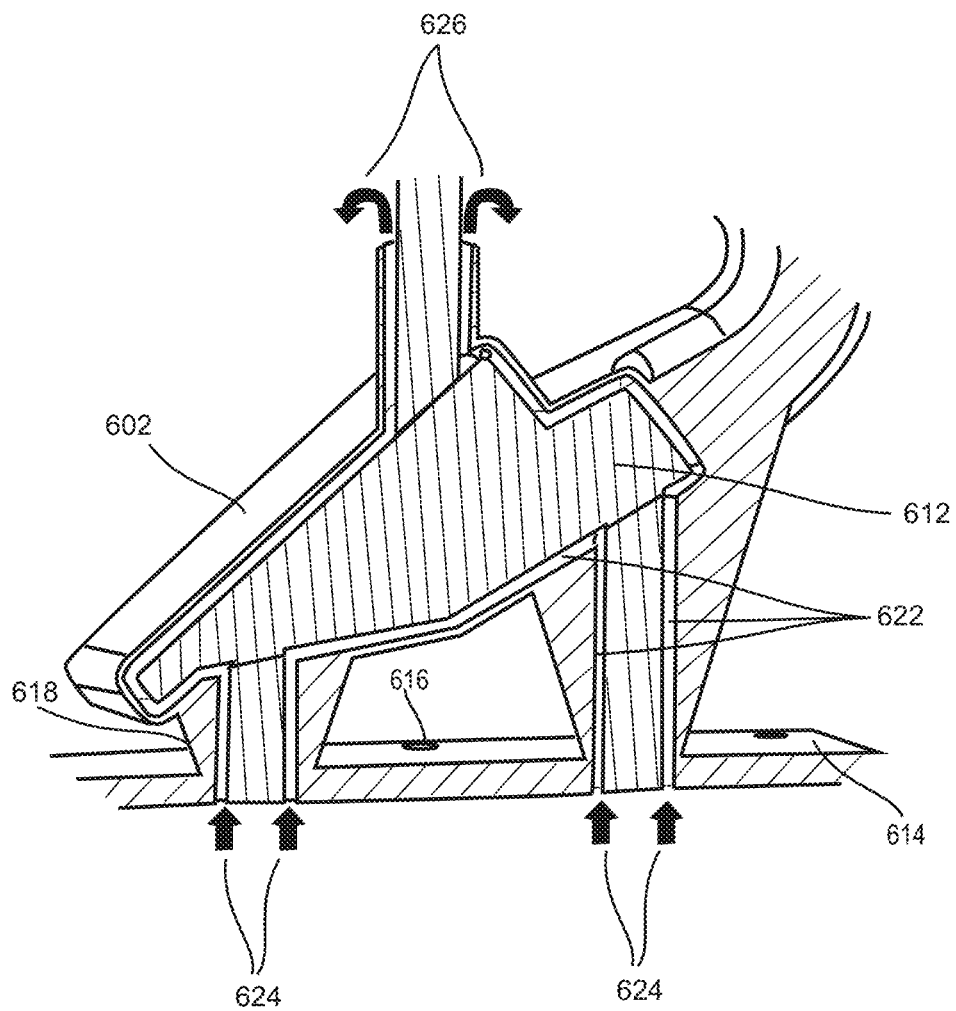
FIG. 6D shows a cross-section view of the tool and electrode of FIG. 6B.

FIG. 6D shows a cross-section view of the tool and electrode of FIG. 6B. This cross-section view shows an example of the addition of built-in electrolyte flow passageways as part of building the modified print file. The tool electrode 612 is printed to include electrolyte flow passages 622 to allow for forced electrolyte flow. The electrolyte flows in through inlets 624 and outlets 626. The electrolyte flow passages 622 that allow forced electrolyte flow enable a simplified OPECM machine cell and faster processing speeds. In other embodiments, the electrode tool may be printed to include numerous small through-holes in the tool electrode to allow for electrolyte flow through the tool electrode, as shown, for example, in FIG. 2B. The through-holes allow for the OPECM operation to be performed in a bath.

Figure 6E:
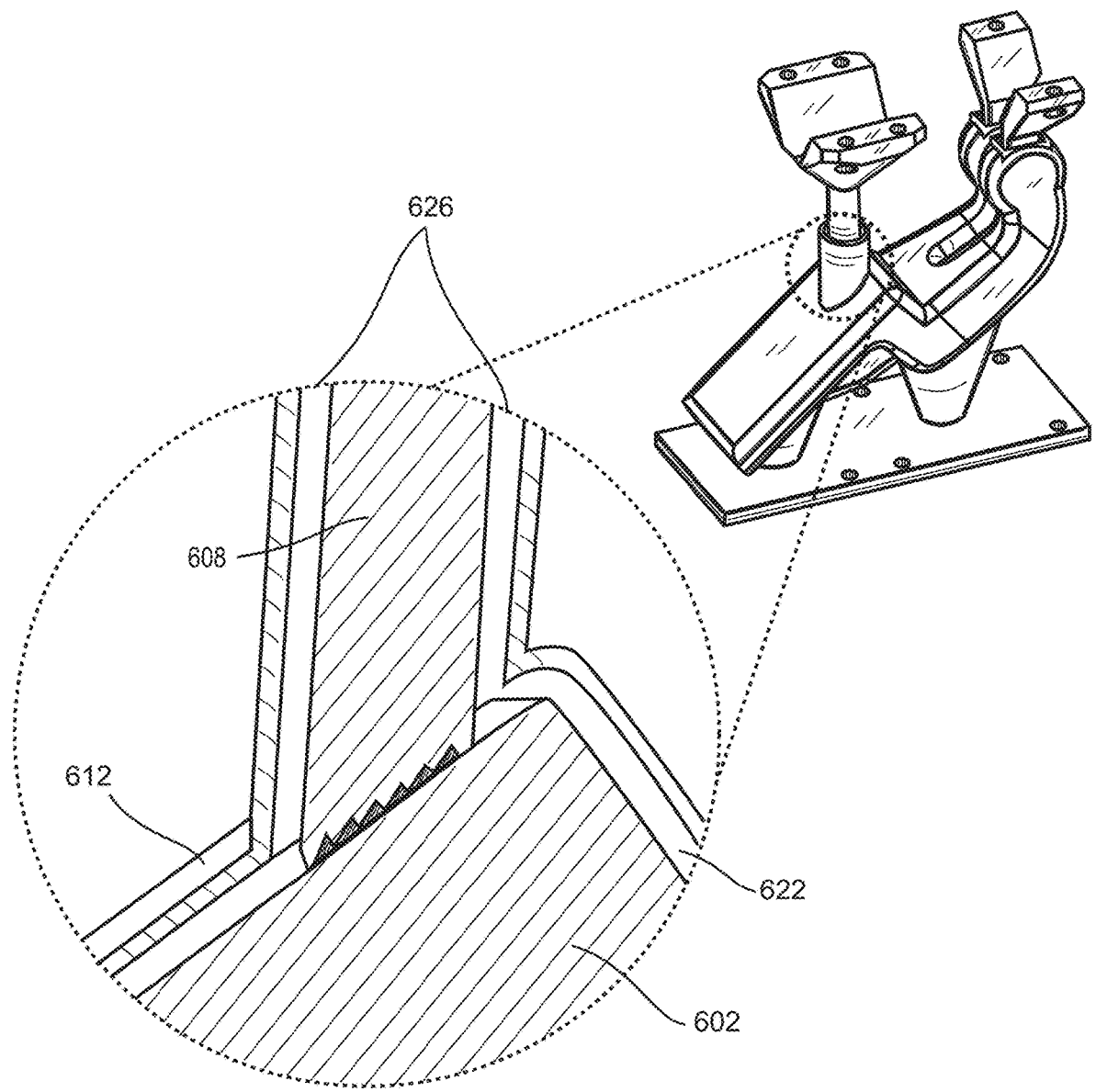
FIG. 6E shows a cross-section view of the tool and electrode of FIG. 6B with additional support material added.

FIG. 6E shows a cross-section view of the tool and electrode of FIG. 6B with additional support material added. This cross-section view shows an example of the addition of support beams 608 as part of building the modified print file of workpiece 602 and electrode 612. One or more support structures 608 may be added where required. The support beams 608 provide support as well as provide routes for electrolyte flow (for example, as seen in passageways 622).

Figure 6F:
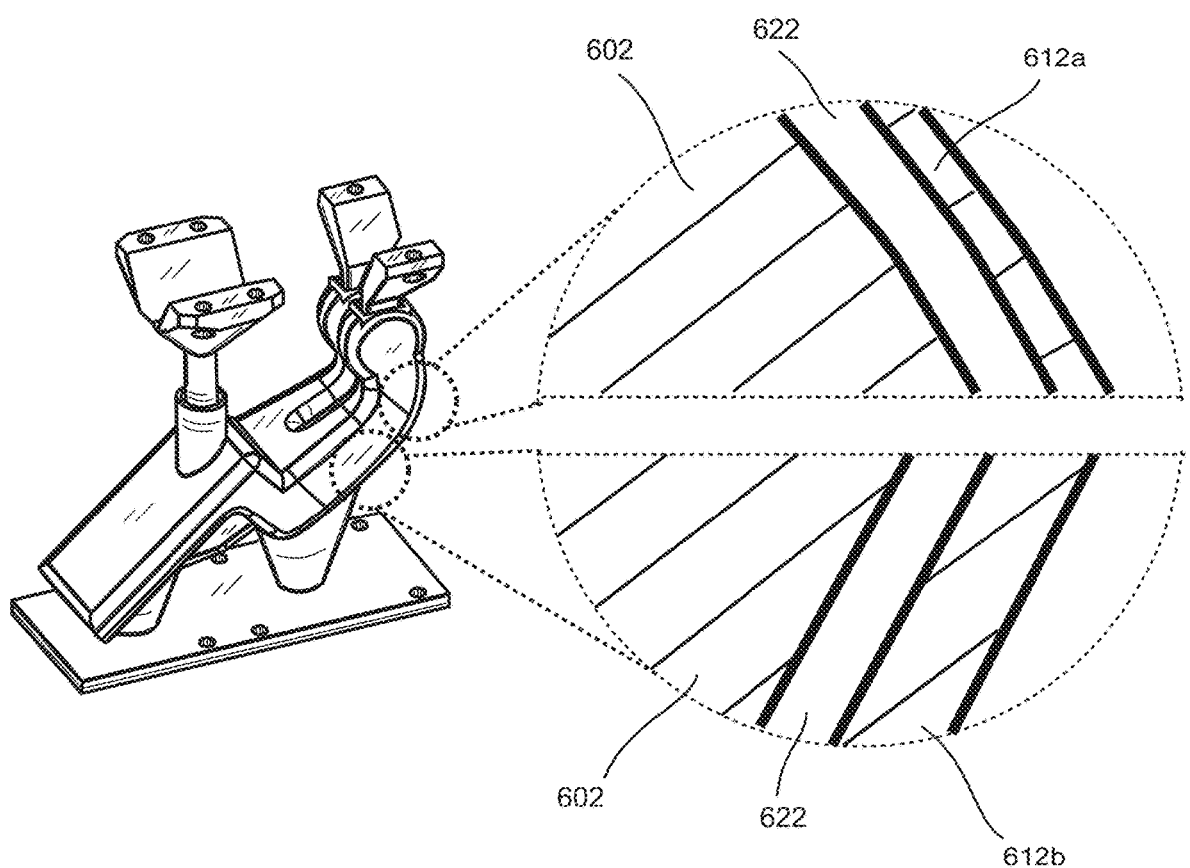
FIG. 6F shows a blown-up cross-section view of the tool and electrode of FIG. 6B showing varying tool thickness for dissolution-based removal.

FIG. 6F shows a blown-up cross-section view of the tool and electrode of FIG. 6B showing varying tool thickness for dissolution-based removal. Referring to FIG. 6F, the body of the tool electrode 612 may be designed for easy removal after completion of the OPECM technique. This example shows an example of how a print file may be modified to add a draft to the tool electrode 612 that will allow the tool electrode to be removed using anodic dissolution. As can be seen in the blown-up cross-section views, the portion of tool electrode 612b is thicker than the portion of tool electrode 612a, which allows for controlled dissolution-based removal.

Figure 6G:
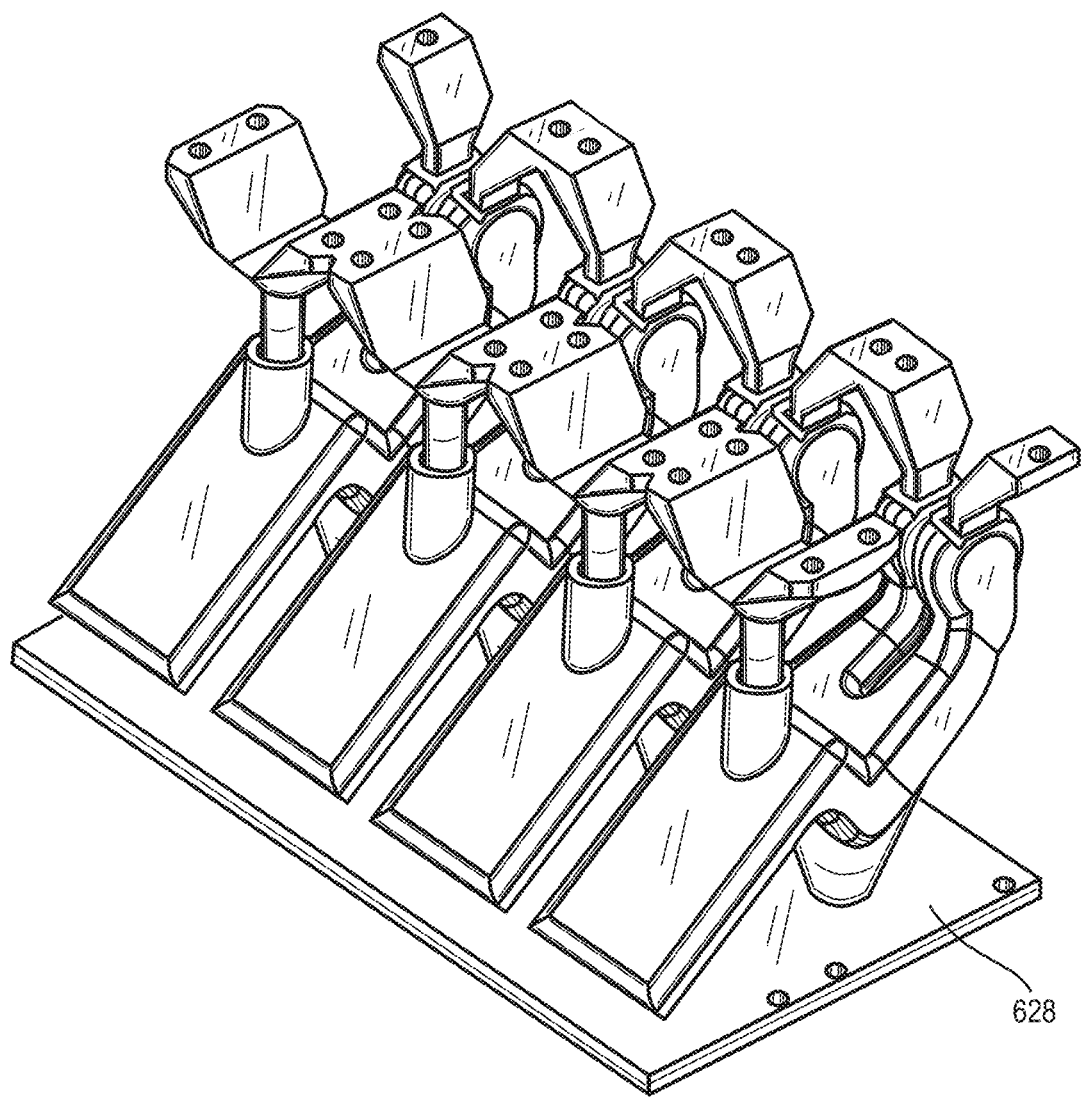
FIG. 6G shows an example of how a print file may be modified to scale up from a single workpiece design to handle multiple workpieces.

FIG. 6G shows an example of how a print file may be modified to scale up from a single workpiece design to handle multiple workpieces. Referring to FIG. 6G, multiple instances (four in this example) of the workpiece 602 and tool electrode 612 are printed together on a single base plate 628. As can be seen, the holes in the fixturing features remain vertically aligned, as shown and described in the FIG. 6C.

The OPECM technique disclosed herein may use different process parameters for different alloys (e.g. stainless steels, inconels, aluminum alloys, titanium alloys, etc.) and for macro-roughness application vs. micro-roughness application. The process parameters may include gap/offset, voltage, and/or pulse times. Based on the process parameters, an optimal transition point from macro-roughness to micro-roughness may be determined.

The motion-control system in the OPECM processing machine provides for vibration/oscillation along two or more axes. The OPECM processing machine may include one or more platforms with mounting features for mounting the target workpiece and the tool electrode such that the target workpiece and the tool electrode are aligned when mounted to the platforms. When the target workpiece and the tool electrode are mounted, there is a gap between a surface of the target workpiece and a surface of the tool electrode. The target workpiece and the tool electrode may be mounted within a chamber or work cell of the OPECM process machine. The chamber/work cell holds an electrolytic solution that is circulated around and within the target workpiece and the tool electrode. The OPECM processing machine may include a motion controller that oscillates the target workpiece and the tool electrode relative to one another, wherein the oscillation follows a motion profile stored in the motion controller. The motion controller may include a general purpose processor running executable computer instructions that control the processing machine to cause it to move along the predefined motion path. The OPECM processing machine may include a voltage controller, which applies voltage waveform across the gap between the surface of the target workpiece and the surface of the tool electrode during polishing. The voltage controller may include any device that generates or applies a voltage, as is known in the art.

As explained above, one aspect of the OPECM technique disclosed herein that makes it beneficial for prototyping is the printing of tooling sets simultaneously with the workpiece that can be used sacrificially. This approach is broadly applicable, which allows it to be adapted to many different 3D-printing environments.

As the volume of workpieces being printed increases, it may become more economical to switch to a non-sacrificial tooling set, such as, for example, a complex "clamshell" design, which may provide more efficient surface finishing and a smaller amount of material dissolution. Such an approach provides for more efficient surface finishing because the surface of the tooling is initially smooth and therefore does not impart any of its own roughness onto the workpiece. This is in comparison to 3D-printed tooling, which uses the bi-polar pulse mechanism described above to simultaneously polish both the tool and the workpiece. This increase in efficiency and the lack of a need to dissolve away the tool results in less waste product, which enhances the economics of the OPECM technique disclosed herein.

As explained above, the OPECM technique disclosed herein removes any necessary support structure just as it removes other forms of macro-roughness. In some embodiments, a support structure may not be needed. In such embodiments, no overhanging surface has a slope shallower than approximately 35 degrees to the build.

In one embodiment, the tool electrode encompassing the workpiece is a direct 1 mm offset of the surface to be machined. For fixturing, a platform may be added to the tool electrode that directly opposes the platform on the workpiece, providing two parallel planes for alignment.

The tool may be perforated with 0.5 mm diameter through holes spaced approximately 1.5 mm apart to allow sufficient electrolyte mobility because the oscillation profile works as a pump.

In one embodiment, an electrolyte flushing mechanism may use a bath-based electrolyte replenishment mechanism.

An electrolyte port through the top of the tool may be added that allows the introduction of pressurized flow. For example, the wall thickness may be 3 mm near the fixturing platform and gradually decreases to 1.5 mm as it gets further from the platform. This allows for the dissolution of the tool to gradually reveal the underlying workpiece after material removal is complete. For printing, the workpiece and tool are connected to ensure a stable position for the tool.

As explained above, most PECM operations involve vibration in a single axis. Consistent with the teachings of the OPECM technique disclosed herein, PECM operations may be enhanced to provide the ability to oscillate/vibrate in two or more axes, which may enhance fluid flow and/or allow for the correction of shapes based on a single PECM tool. In addition, by biasing the motion to a single region, preferential removal may be performed where it is most needed. Additionally, the voltage differential may be selectively modified or adjusted at different points along the motion path to achieve preferential removal where it is desired on the target workpiece. These adjustments provide the ability to tune the process to a particular design, thereby improving accuracy and reducing the PECM or ECM tool design effort.

A method of electrochemical machining is disclosed. The method includes designing a tool electrode to be used for removing material from a target workpiece, wherein the shape of the tool electrode is based on the shape of the target workpiece. The method includes fixing the target workpiece into a first platform of a processing machine and fixing the tool electrode into a second platform of the processing machine. In the method of electrochemical machining disclosed, the target workpiece and the tool electrode are aligned when fixed into the processing machine such that there is a gap between a surface of the target workpiece and a surface of the tool electrode. Material is removed from the target workpiece by causing the tool electrode to oscillate while moving in a predetermined motion path relative to the target workpiece while applying a voltage across the gap between the surface of the target workpiece and the surface of the tool electrode. The predetermined motion path provides motion along at least two axes, and the predetermined motion path begins and ends at approximately the same point in space.

Similarly, an apparatus for electrochemical machining is disclosed. The apparatus includes a first platform for mounting a target workpiece and a second platform for mounting a tool electrode. The first platform and second platform each include a mounting feature. The target workpiece and the tool electrode are aligned when mounted to the first platform and the second platform such that there is a gap between a surface of the target workpiece and a surface of the tool electrode. The apparatus includes a motion controller configured to cause the tool electrode to oscillate while moving in a predetermined motion path relative to the target workpiece, wherein the predetermined motion path is stored in a memory of the motion controller. The predetermined motion path provides motion along at least two axes, and the predetermined motion path begins and ends at approximately the same point in space. The apparatus includes a voltage controller configured to apply a voltage across the gap between the surface of the target workpiece and the surface of the tool electrode. The apparatus includes an electrolytic solution that creates an electrical resistance in the gap between the surface of the target workpiece and the surface of the tool electrode, wherein the electrolytic solution flows in said gap.

In various embodiments of the method of electrochemical machining and the apparatus for electrochemical machining disclosed herein, the target workpiece may be manufactured using additive manufacturing, the tool electrode may be manufactured using additive manufacturing, the target workpiece and the tool electrode may be manufactured together in-situ, or they may be manufactured together in-situ using additive manufacturing, or they may be manufactured separately from each other.

The shape of the tool electrode is defined by an offset from the target workpiece. In various embodiments, the offset between the tool electrode and the target workpiece may be a uniform offset or a non-uniform offset. The shape of the tool electrode is based on an offset from the target workpiece of approximately 1 mm. The offset from the target workpiece may be in the range of approximately 0.1 mm to approximately 2.0 mm.

In embodiments with a non-uniform offset, the non-uniform offset is selected to achieve a target geometry of the target workpiece when material removal from the target workpiece has completed or is selected to account for varying machining speeds of features of the target workpiece.

In various embodiments, the predetermined motion path causes oscillation between the tool electrode and the target workpiece to occur in two dimensions or to occur in three dimensions.

The method of electrochemical machining may further include adjusting the scale of the predetermined motion path of the oscillation to compensate for the gap between the tool electrode and the target workpiece becoming larger as material is removed. This means the tool electrode follows the predefined motion path relative to the target workpiece; however, the scale of the movement in or all of the axes may be amplified to account for material removal. In other words, the path remains the same, but the amplitude of the path relative to the target workpiece may change.

In various embodiments, the predetermined motion path is repeated over a plurality of cycles, each cycle adjusting an amplitude of the predetermined motion path in at least one axis to account for removal of material. In various embodiments, the adjustment is done discretely for a cycle or is done continuously during a cycle.

In various embodiments, the predetermined motion path is selected such that the path does not cross over itself.

The voltage may vary based on a fixed current, or the voltage may be fixed such that the current varies based on the fixed voltage. The voltage may be controlled such that the voltage varies based on a current position of the tool electrode along the predetermined motion path.

The method of electrochemical machining may further include circulating an electrolytic solution in the gap between the surface of the target workpiece and the surface of the tool electrode to create an electrical resistance between the surface of the tool electrode and the surface of the target workpiece. The tool electrode may include one or more through-holes to allow for flow of an electrolytic solution.

The method of electrochemical machining may further include removing the tool electrode. The tool electrode may be removed by manually removing the tool electrode from the machine or by dissolving the tool electrode by applying an anodic voltage to the tool electrode.

In various embodiments of the apparatus for electrochemical machining, the gap between the surface of the target workpiece and the surface of the tool electrode may be uniform or may be non-uniform. The gap between the surface of the target workpiece and the surface of the tool electrode is approximately 1 mm. The gap between the surface of the target workpiece and the surface of the tool electrode is in the range of approximately 0.1 mm to approximately 2.0 mm. In embodiments where the gap is non-uniform, the shape of the non-uniform gap is selected to achieve a target geometry of the target workpiece when material removal from the target workpiece has completed or is selected to account for varying machining speeds of features of the target workpiece.

In various embodiments of the apparatus for electrochemical machining, the predetermined motion path may cause oscillation between the tool electrode and the target workpiece to occur in two dimensions, or the predetermined motion path may cause oscillation between the tool electrode and the target workpiece to occur in three dimensions.

The motion controller of the apparatus may be further configured to adjust the scale of the motion path to compensate for the gap between the tool electrode and the target workpiece becoming larger as material is removed.

The predetermined motion path may be repeated over a plurality of cycles, each cycle adjusting an amplitude of the predetermined motion path along at least one axis to account for removal of material. In various embodiments, the adjustment may be done discretely for a cycle or may be done continuously during a cycle.

The predetermined motion path may be selected such that the path does not cross over itself.

In various embodiments, the voltage applied by the voltage controller may vary based on a fixed current, or the voltage may be fixed and the current varies based on the fixed voltage. The voltage may be controlled such that the voltage varies based on a current position of the tool electrode along the predetermined motion path.

In an embodiment, the tool electrode includes one or more through-holes to allow for flow of the electrolytic solution.

In an embodiment of the apparatus for electrochemical machining, the voltage controller is further configured to dissolve the tool electrode by applying a constant anodic voltage to the tool electrode.

A method of electrochemical machining is disclosed. The method includes aligning a target workpiece and a tool electrode for electrochemical machining such that there is a gap between a surface of the target workpiece and a surface of the tool electrode. The method further includes moving the tool electrode in a predetermined motion path relative to the target workpiece while applying a voltage across the gap between the surface of the target workpiece and the surface of the tool electrode to remove material from the target workpiece. The gap includes a moving electrolytic solution.

A method of electrochemical machining of additively manufactured parts is disclosed. The method includes designing a tool electrode to be used for removing material from a target workpiece. The shape of the tool electrode is based on the shape of the target workpiece, and the tool electrode includes a through-hole to allow for flow of an electrolytic solution. The method includes additively manufacturing the target workpiece and the tool electrode together in-situ. The method includes fixing the target workpiece into a first platform of a processing machine and fixing the tool electrode into a second platform of the processing machine. The target workpiece and the tool electrode are aligned when fixed into the processing machine such that there is a gap between a surface of the target workpiece and a surface of the tool electrode. The gap is a non-uniform offset selected to achieve a target geometry of the target workpiece when material removal from the target workpiece has completed. The method includes circulating the electrolytic solution in the gap between the surface of the target workpiece and the surface of the tool electrode to create an electrical resistance between the surface of the tool electrode and the surface of the target workpiece. The method includes removing material from the target workpiece by moving the tool electrode in a predetermined motion path relative to the target workpiece while applying a voltage across the gap between the surface of the target workpiece and the surface of the tool electrode. The predetermined motion path causes oscillation between the tool electrode and the target workpiece to occur in three dimensions. The predetermined motion path provides motion along at least two axes. The predetermined motion path begins and ends at approximately the same point in space. The method includes removing the tool electrode using anodic dissolution.

A method of electrochemical machining of additively manufactured parts is disclosed. The method includes designing a tool electrode to be used for removing material from a target workpiece, wherein the shape of the tool electrode is based on the shape of the target workpiece. The method includes manufacturing the target workpiece using additive manufacturing and manufacturing the tool electrode using additive manufacturing. The method includes fixing the target workpiece into a processing machine by attaching a support structure that is integrated into the target workpiece to a first platform of the processing machine. The method includes fixing the tool electrode into the processing machine by attaching a support structure that is integrated into the tool electrode to a second platform of the processing machine. The target workpiece and the tool electrode are aligned when fixed into the processing machine such that there is a gap between a surface of the target workpiece and a surface of the tool electrode. The method includes removing material from the target workpiece by causing the tool electrode to oscillate relative to the target workpiece while applying a voltage waveform across the gap between the surface of the target workpiece and the surface of the tool electrode. The method includes removing the tool electrode. The target workpiece and the tool electrode are manufactured together in-situ.

An apparatus for electrochemical machining of additively manufactured parts is disclosed. The apparatus includes a first platform for mounting a target workpiece, wherein the first platform includes a mounting feature. The apparatus includes a second platform for mounting a tool electrode, wherein the second platform includes a mounting feature. The target workpiece and the tool electrode are aligned when mounted to the first platform and the second platform such that there is a gap between a surface of the target workpiece and a surface of the tool electrode. The apparatus includes a motion controller configured to oscillate the target workpiece and the tool electrode relative to one another, wherein the oscillation follows a motion profile stored in the motion controller. The apparatus includes a voltage controller configured to apply a voltage waveform across the gap between the surface of the target workpiece and the surface of the tool electrode. The apparatus includes an electrolytic solution for providing an electrical resistance between the surface of the target workpiece and the surface of the tool electrode, wherein the electrolytic solution is located between the target workpiece and the tool electrode.

The description and figures provided above are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. Multiple appearances of the phrase "in one embodiment" in various places in the specification are not necessarily all referring to the same embodiment, nor are separate or alternative embodiments mutually exclusive of other embodiments. The various described features may be exhibited by some embodiments and not by others. Similarly, the various described requirements may be requirements for some embodiments but not for other.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

Alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given.

Unless otherwise defined, all technical and scientific terms used herein have the same meaning as commonly understood by one of ordinary skill in the art to which this disclosure pertains. In the case of conflict, the present document, including definitions, will control.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention described herein refer to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of electrochemical machining, the method comprising:
    designing a tool electrode to be used for removing material from a target workpiece, wherein the shape of the tool electrode is based on the shape of the target workpiece;
    fixing the target workpiece into a first platform of a processing machine;
    fixing the tool electrode into a second platform of the processing machine;
    wherein the target workpiece and the tool electrode are aligned when fixed into the processing machine such that there is a gap between a surface of the target workpiece and a surface of the tool electrode; and
    removing material from the target workpiece by causing the tool electrode to oscillate while moving in a predetermined motion path relative to the target workpiece while applying a voltage across the gap between the surface of the target workpiece and the surface of the tool electrode,
    wherein the predetermined motion path provides motion in three dimensions along a Hamiltonian path around the target workpiece.

2. The method of claim 1, wherein the tool electrode is manufactured using additive manufacturing.

3. The method of claim 1, wherein the target workpiece and the tool electrode are manufactured together in-situ.

4. The method of claim 1, wherein the shape of the tool electrode is defined by an offset from the target workpiece.

5. The method of claim 4, wherein the offset between the tool electrode and the target workpiece is a non-uniform offset selected to achieve a target geometry of the target workpiece when material removal from the target workpiece has completed and to account for varying machining speeds of features of the target workpiece.

6. The method of claim 1, wherein the predetermined motion path causes oscillation between the tool electrode and the target workpiece to occur in three dimensions.

7. The method of claim 1, further comprising adjusting the scale of the predetermined motion path of the oscillation to compensate for the gap between the tool electrode and the target workpiece becoming larger as material is removed.

8. The method of claim 1, wherein the voltage is controlled such that the voltage varies based on a current position of the tool electrode along the predetermined motion path.

9. The method of claim 1, further comprising circulating an electrolytic solution in the gap between the surface of the target workpiece and the surface of the tool electrode to create an electrical resistance between the surface of the tool electrode and the surface of the target workpiece.

10. The method of claim 1, wherein the tool electrode includes one or more through-holes to allow for flow of an electrolytic solution.

11. The method of claim 1, further comprising removing the tool electrode, wherein the tool electrode is removed by dissolving the tool electrode by applying an anodic voltage to the tool electrode.

12. An apparatus for electrochemical machining, the apparatus comprising:
    a first platform for mounting a target workpiece, wherein the first platform includes a mounting feature;
    a second platform for mounting a tool electrode, wherein the second platform includes a mounting feature;
    wherein the target workpiece and the tool electrode are aligned when mounted to the first platform and the second platform such that there is a gap between a surface of the target workpiece and a surface of the tool electrode;
    a motion controller configured to cause the tool electrode to oscillate while moving in a predetermined motion path relative to the target workpiece, wherein the predetermined motion path is stored in a memory of the motion controller, wherein the predetermined motion path provides motion in three dimensions along a Hamiltonian path around the target workpiece;
    a voltage controller configured to apply a voltage across the gap between the surface of the target workpiece and the surface of the tool electrode; and
    an electrolytic solution that creates an electrical resistance in the gap between the surface of the target workpiece and the surface of the tool electrode, wherein the electrolytic solution flows in said gap.

13. The apparatus of claim 12, wherein the tool electrode is manufactured using additive manufacturing.

14. The apparatus of claim 12, wherein the target workpiece and the tool electrode are manufactured together in-situ.

15. The apparatus of claim 12, wherein the gap between the surface of the target workpiece and the surface of the tool electrode is a non-uniform gap that is selected to achieve a target geometry of the target workpiece when material removal from the target workpiece has completed and to account for varying machining speeds of features of the target workpiece.

16. The apparatus of claim 12, wherein the predetermined motion path causes oscillation between the tool electrode and the target workpiece to occur in three dimensions.

17. The apparatus of claim 12, wherein the motion controller is further configured to adjust the scale of the motion path to compensate for the gap between the tool electrode and the target workpiece becoming larger as material is removed.

18. The apparatus of claim 12, wherein the voltage is controlled such that the voltage varies based on a current position of the tool electrode along the predetermined motion path.

19. The apparatus of claim 12, wherein the tool electrode includes one or more through-holes to allow for flow of the electrolytic solution.

20. The apparatus of claim 12, wherein the voltage controller is further configured to dissolve the tool electrode by applying a constant anodic voltage to the tool electrode.

* * * * *